(12) United States Patent
Amara et al.

(10) Patent No.: US 7,173,971 B2
(45) Date of Patent: Feb. 6, 2007

(54) TRAILING ARTIFACT AVOIDANCE SYSTEM AND METHOD

(75) Inventors: Foued Ben Amara, Vancouver (CA); James Au, Port Coquitlam (CA); Ali Jerbi, Vancouver (CA); Faouzi Kossentini, Vancouver (CA)

(73) Assignee: UB Video Inc., Vancouver (CA)

( * ) Notice: Subject to any disclaimer, the term of this patent is extended or adjusted under 35 U.S.C. 154(b) by 778 days.

(21) Appl. No.: 10/299,840

(22) Filed: Nov. 20, 2002

(65) Prior Publication Data

US 2004/0095511 A1    May 20, 2004

(51) Int. Cl.
   *H04B 1/66* (2006.01)
(52) U.S. Cl. .......................... 375/240.27; 375/240.12; 375/240.13; 375/240.24; 375/240.25; 382/238; 382/236; 382/233; 382/268; 382/275
(58) Field of Classification Search ........... 375/240.27, 375/240.12, 240.13, 240.24, 240.25; 382/238, 382/236, 233, 268, 275
   See application file for complete search history.

(56) References Cited

U.S. PATENT DOCUMENTS

| | | | | |
|---|---|---|---|---|
| 6,363,117 B1 * | 3/2002 | Kok | .................. | 375/240.24 |
| 6,845,180 B2 * | 1/2005 | Matthews | .................. | 382/268 |
| 6,973,221 B1 * | 12/2005 | Xue | .................. | 382/268 |
| 6,993,191 B2 * | 1/2006 | Petrescu | .................. | 382/205 |

OTHER PUBLICATIONS

Gunturk, B.K.; Altunbasak, Y.; Mersereau, R.M., "Multiframe Blocking-Artifact Reduction for Transform-Coded Video", IEEE Transactions on Circuits and Systems for Video Technology (USA), Apr. 2002, pp. 276-282, vol. 12, No. 4, IEEE, United States.

Lee, Kyeong-Hwan; Hwang, Hee-Chul; Choi, Jung-Hyun; Lee, Bub-Ki; Kim, Duk-Gyoo, "Blocking Artifact Reduction Techniques for MPEG CODEC", Proceedings of the International Conference on Imaging Science, Systems, and Technology. CISST'2000, Jun. 26-Jun. 29, 2000, pp. 521-527, vol. 2, CSREA Press —Univ. Georgia, Athens, United States.

Jung, Shi Chang; Paik, Joon Ki, "Modified Regularized Image Restoration for Postprocessing Inter-Frame Coded Images", Proceedings 1999 International Conference on Image Processing, Oct. 24-Oct. 28, 1999, pp. 474-478, vol. 3, IEEE, Piscataway, United States.

(Continued)

*Primary Examiner*—Shawn S. An
(74) *Attorney, Agent, or Firm*—McCarthy Tétrault LLP; Christopher N. Hunter

(57) ABSTRACT

A system and method is provided to avoid or otherwise reduce luminance and/or chrominance trailing artifacts in block-based hybrid video coders using multiple block sizes and shapes. The proposed trailing artifact avoidance approach has at its core three main components. The first component is a method to identify flat blocks in the source frame that are most susceptible to the appearance of trailing artifacts, and where flatness is determined according to several proposed criteria. The second component is a method to identify bad blocks, which refer to predicted blocks in motion estimation that correspond to flat blocks in the source frame and that contain trailing artifacts. The third component is a method to avoid trailing artifacts when they are detected within a bad block, and where the avoidance is achieved by employing one or more tools from among a proposed set of high fidelity coding tools and/or high performance motion estimation tools.

130 Claims, 10 Drawing Sheets

OTHER PUBLICATIONS

Chou, Jim; Crouse, M.; Ramchandran, K., "A Simple Algorithm for Removing Blocking Artifacts in Block-Transform Coded Images", IEEE Signal Processing Letters, Feb. 1998, pp. 33-35, vol. 5, No. 2, IEEE, United States.

Shen, Mei-Yin; Kim, Jog Won; Kuo, Jay C.C., "Fast Compression Artifact Reduction Technique Based on Nonlinear Filtering", ISCAS'99 Proceedings for the 1999 IEEE International Symposium on Circuits and Systems VLSI, May 30-Jun. 2, 1999, pp. 179 182, vol. 4, IEEE, Piscataway, United States.

Hu, J.; Sinaceur, N.; Li, F.; Fan, Z., "A Simplified Approach to Reduce Compression Artifacts in Transform Coded-Images", Proceedings of the IASTED International Conference: Signal and Image Processing, Nov. 11-Nov. 14, 1996, pp. 110-114, IASTED, Anaheim, United States.

Meier, T.; Ngan, K.N.; Crebbin, G., "Reduction of Coding Artifacts at Low Bit Rates", Proceedings of the SPIE—The International Society for Optical Engineering, Jan. 28-Jan. 30, 1998, pp. 241-251, vol. 3309, SPIE-Int. Soc. Opt. Eng, United States.

* cited by examiner

TRAILING ARTIFACT AVOIDANCE SYSTEM AND METHOD

BACKGROUND OF THE INVENTION

1. Field of the Invention

The present invention relates to a system and method for avoiding trailing artifacts in block processed video images.

2. Description of the Prior Art

There is an increasing reliance on video data in rich media applications running on interconnected devices or systems such as personal computers, wireless devices, surveillance systems, video conferencing systems and set-top boxes. Video data compression systems play a key role in increasing the efficiency of video data transmission. Video data is compressed or coded for transmission by taking advantage of the spatial redundancies within a given frame and the temporal redundancies between successive frames. Intraframe compression operates on single frames independently of other frames to exploit spatial redundancies within the frame, whereas interframe compression exploits both spatial and temporal redundancies.

Video compression systems exploit temporal redundancies using interframe prediction coding. Interframe coding is based on predicting the current source frame using the previously coded frame, and coding only the prediction error between the source frame and the predicted frame. Approximations are done in the prediction process, by assuming the motion is uniform across all pixels of each motion estimation block in each frame. It is noted that intercoding can be done for both uni-directional and bi-directional prediction. Transmission efficiencies are realised in interceding by transmitting the prediction error, as the amount of information present in the prediction error is generally less than that in the actual pixel values. However, when the prediction errors are not accurately reproduced by the coding process, a number of artifacts appear in the reconstructed video image. Trailing artifacts are an example of such artifacts and are related to motion in successive source frames. More specifically, trailing artifacts are directly related to situations where edges of a moving object in the video data fall on the edge pixels in the source blocks of the source frames, and appear as a series of dots or a series of groups of pixels that trail the moving object in the reconstructed frame. The artifacts can occur due to a coding skip, where the prediction error corresponding to a given source block is not coded, and/or coding of the prediction error with a large quantization value. The appearance of trailing artifacts can lead to a degradation in the quality of the video image. The problem can be more pronounced when trailing artifacts appear in flat areas of the image that do not have much spatial details, since such artifacts could be easily detected by the human eye in such areas.

It is an object of the present invention to provide a trailing artifact avoidance system and method to obviate or mitigate some of the above-presented disadvantages.

SUMMARY OF THE INVENTION

Luminance and/or chrominance trailing artifacts can degrade the quality of the reconstructed image. The artifacts are created by block-based video coders, through inaccurate reproduction of the prediction errors introduced when coding successive video frames. One embodiment of the present invention helps to avoid or minimize the appearance of the artifacts in reconstructed frames by identifying flat blocks in a source frame that are most susceptible to the appearance of trailing artifacts, where the flatness is determined according to several criteria. The reconstructed frame can be a result of inter or intra prediction. The embodiment also identifies bad blocks, which refer to predicted blocks in motion estimation that correspond to the flat blocks in the source frame and that contain trailing artifacts. The trailing artifacts are avoided when they are detected within the bad block by employing one or more tools from among a set of high fidelity coding tools and/or high performance motion estimation tools.

According to the present invention there is provided a system to detect the presence of trailing artifacts in predicted blocks and to mimimise the appearance of the detected trailing artifacts in the reconstructed video blocks. The system comprises an input for a source block having an array of source pixels, and an input for a predicted block, corresponding to the source block, and having an array of predicted pixels. The system also has a type processor for characterizing the source block as having a predefined flatness type by defining each pixel in a grouping of the source pixels as having an average image characteristic. Further, for the predicted block corresponding to the source block having the predefined flatness type, an artifact detector locates a grouping of predicted pixels in the predicted block that indicate a presence of the artifact. An artifact avoidance processor reduces or eliminates the presence of the identified artifact in the reconstructed block. The artifact avoidance processor produces a revised predicted block with reduced trailing artifacts using high performance motion estimation, and/or encodes the prediction residuals using a high fidelity coding mode so that the reconstructed block is substantially free of trailing artifacts.

According to a further aspect of the present invention there is provided a system for avoiding an identified artifact from a predicted video block, the system comprising: an input for a source block having an array of source pixels and for the predicted block corresponding to the source block; a type processor for characterizing the source block as a predefined flat type by defining a grouping of the source pixels as having an average image characteristic; an artifact detector for locating a grouping of predicted pixels in the predicted block that indicate a presence of the artifact, when the predicted block corresponds to the source block having the predefined flat type; and an artifact avoidance processor for minimizing the presence of the identified artifact from a compensated reconstructed block corresponding to the predicted block; wherein the identified artifact is absent from or visually less apparent in the compensated reconstructed block.

According to a further aspect of the present invention there is provided a method for avoiding an identified artifact from a predicted video block, the method comprising the steps of: obtaining a source block having an array of source pixels and obtaining the predicted block corresponding to the source block; characterizing the source block as a predefined flat type by defining a grouping of the source pixels as having an average image characteristic; locating a grouping of predicted pixels in the predicted block that indicate a presence of the artifact, when the predicted block corresponds to the source block having the predefined flat type; and minimizing the presence of the identified artifact from a compensated reconstructed block corresponding to the predicted block; wherein the identified artifact is absent from or visually less apparent in the compensated reconstructed block.

According to a still further aspect of the present invention there is provided a computer program product for avoiding an identified artifact from a predicted video block, the product comprising: a computer readable medium; an input module stored on the medium for obtaining a source block having an array of source pixels and for obtaining the predicted block corresponding to the source block; a type module coupled to the input module for characterizing the source block as a predefined flat type by defining a grouping of the source pixels as having an average image characteristic; an artifact detector module coupled to the type module for locating a grouping of predicted pixels in the predicted block that indicate a presence of the artifact, when the predicted block corresponds to the source block having the predefined flat type; and an artifact avoidance module coupled to the detector module for minimizing the presence of the identified artifact from a compensated reconstructed block corresponding to the predicted block; wherein the identified artifact is absent from or visually less apparent in the compensated reconstructed block.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
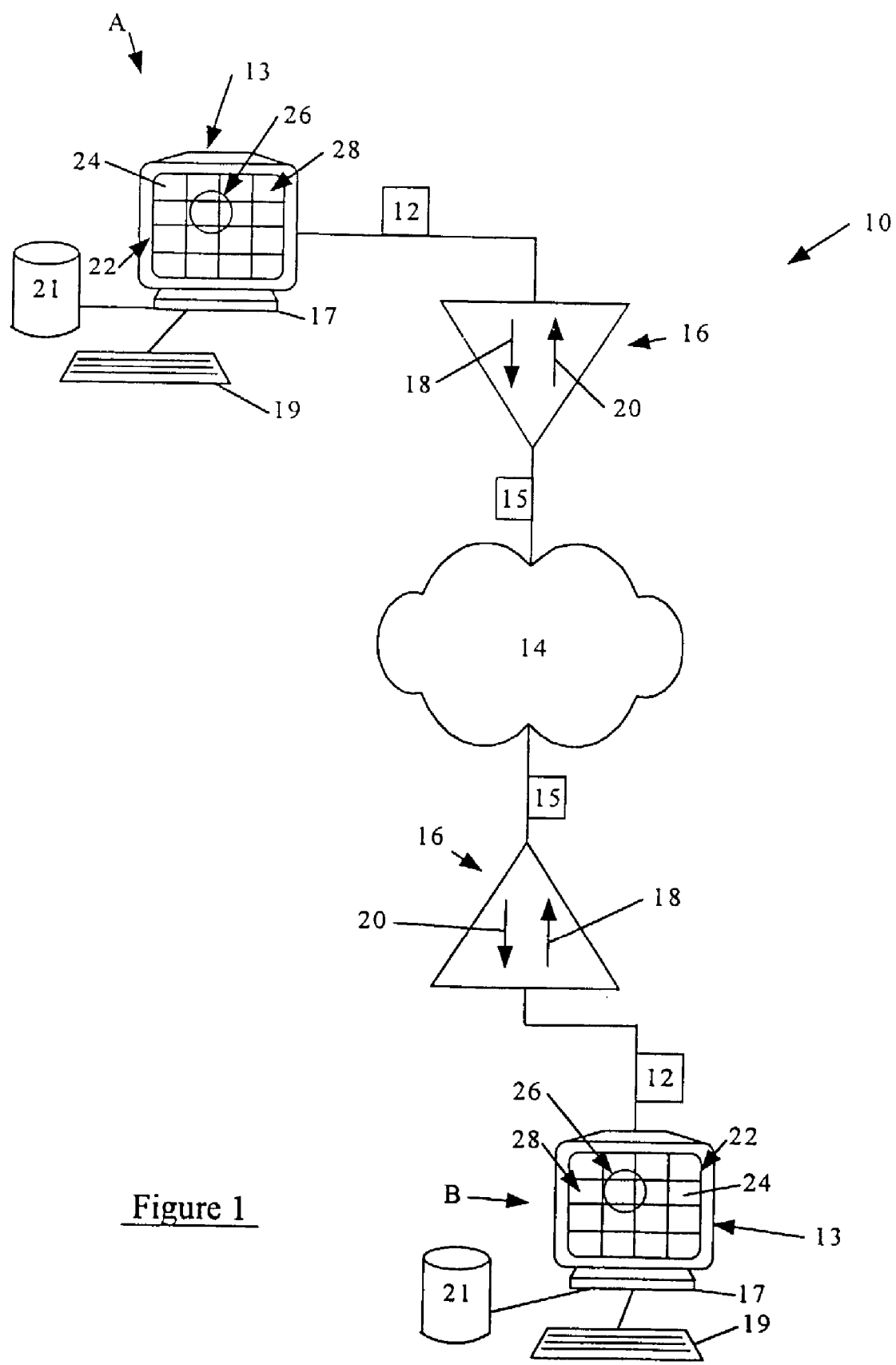
FIG. 1 is a diagram of a video conferencing system 10.

Referring to FIG. 1, such as but not limited to, a video conferencing system 10 has participants A and B that exchange video data 12 between monitors 13, formatted as a compressed bit stream 15 over a network 14 (such as but not limited to the Internet). Each participant A, B has a video processor 16 having an encoder 18 for encoding transmitted video data 12 and a decoder 20 for decoding the received bit stream 15. Each image frame 22 displayed on the monitors 13 is made of a series of macroblocks 24, such as but not limited to a block of 16×16 pixels, representing an object 26 which moves over a background 28 (for example a person giving a presentation while standing in front of a backdrop). Accordingly, the processors 16 coordinate the display of successive frames 22 on the monitors 13, as the video data 12 is communicated between the participants A, B during a video conference. It is recognised that applications of the system 10 other than video conferencing also involve the exchange of video data 12 in the compressed bit stream 15. It will be recognised that the system 10 may also involve the exchange of video data 12 in the compressed bit stream 15 in either one direction or both and on peer to peer basis or broadcast, as well as used in personal computers, wireless devices, surveillance systems, video conferencing systems and set-top boxes. In addition, the transfer of the compressed bit stream 15 through the encoder 18 and decoder 20 could be to a storage device (not shown) for later usage.

The video data 12 is a temporal sequence of pictures, each referred to as the frame 22. Each frame 22 is composed of three images; one red (R), one green (G), and one blue (B). However, for compatibility with non-coloured media, the RGB model is represented as an equivalent YcbCr model, where Y is a luminance (luma) component, and Cb and Cr are chrominance (chroma) components, such that typically $Y=0.299R+0.587G+0.114B$, $Cb=B-Y$, and $Cr=R-Y$. Therefore, each frame 22 of the video data 12 is generically referred to as containing one luma image, one Cb chroma image, and one Cr chroma image. Standard formats have 8 bits per pixel to digitally represent each of the three components, where Cb and Cr images are typically down-sampled by 2 in each dimension due to the sensitivity of human vision. Each frame 22 of the video data 12 is typically made up of macroblocks 24 (see FIG. 2) consisting of a grouping of pixels, such as a 16×16 luma macroblock with the two associated 8×8 chroma blocks, which are processed and compressed for transmission as the bit stream 15 over the network 14.

Referring again to FIG. 1, the system 10 can also include a system processor 17. The processor 17 is coupled to the monitor 13 and to a user input device 19, such as a keyboard, mouse, or other suitable device. If the monitor 13 is touch sensitive, then the monitor 13 itself can be employed as the user input device 19. A computer readable storage medium 21 is coupled to the processor 17 for providing instructions to the processor 17 to instruct and/or configure the operation of the monitor 13, the video processor 16, and other parts of the system 10 used to encode/decode the video data 15/bit stream 15 over the network 14. The computer readable medium 21 can include hardware and/or software such as, by way of example only, magnetic disks, magnetic tape, optically readable medium such as CD ROM's, and semiconductor memory such as PCMCIA cards. In each case, the medium 21 may take the form of a portable item such as a small disk, floppy diskette, cassette, or it may take the form of a relatively large or immobile item such as hard disk drive, solid state memory card, or RAM coupled to the processor 17. It should be noted that the above listed example mediums 21 can be used either alone or in combination. Accordingly, a trailing artifact avoidance algorithm, as further defined below, can be implemented by the system 10 to minimise the creation of artifacts T1, T2 (see FIG. 3) in the video frames 22 of the video data 12, which could be useful in applications such as video conferencing and other applications such as broadcast video or streaming video applications where it is not desirable to include any artifacts T1, T2 in the compressed bit stream 15.

Figure 2:
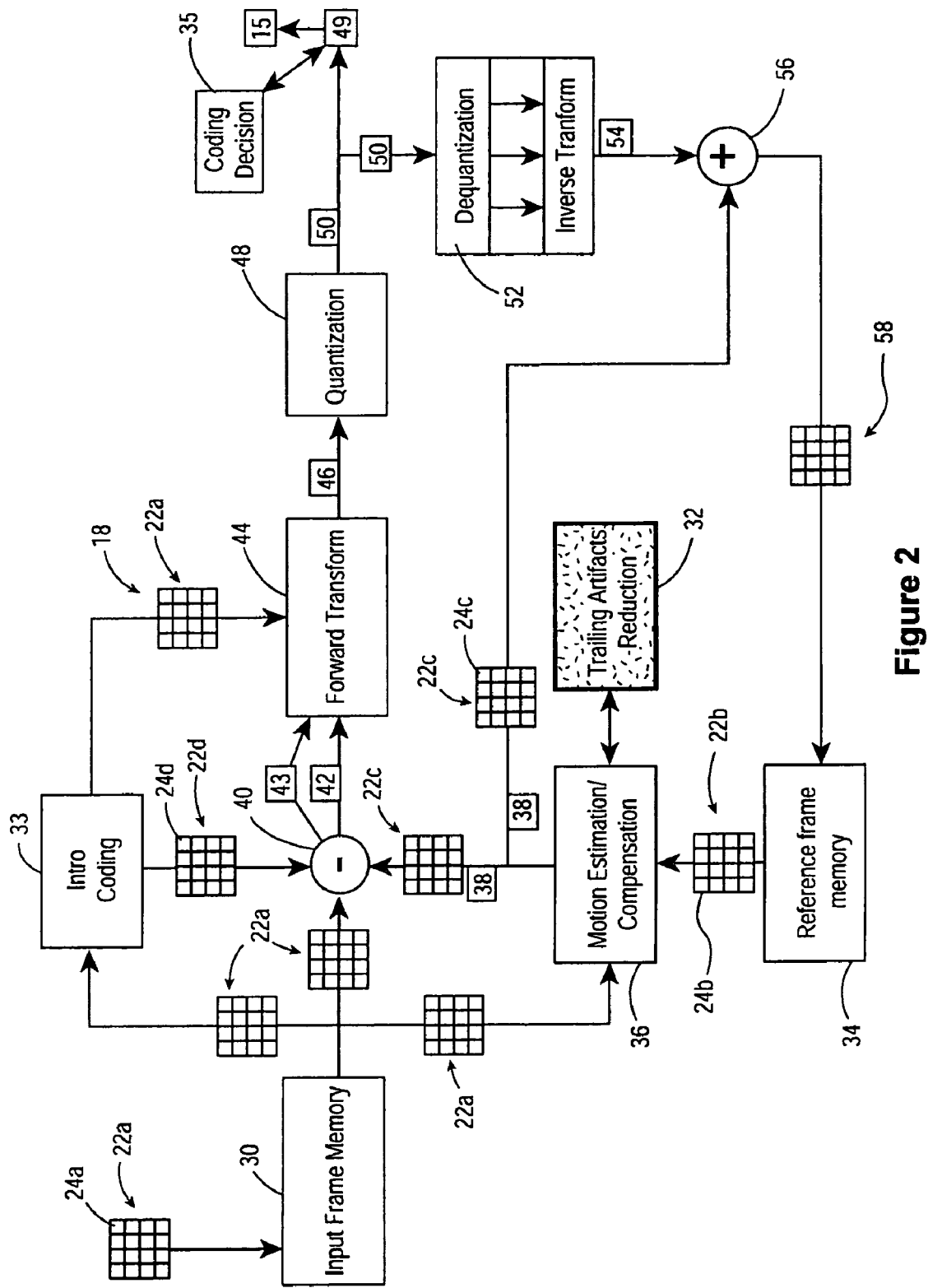
FIG. 2 is an encoder from the system of FIG. 1.

Referring to FIG. 2, the encoder 18 of the system 10 has an input frame memory 30, for receiving an Nth or source frame 22a (a sequence of source blocks 24a) in the video data 12 (see FIG. 1). A reference frame memory 34 stores an (N−1)th or reference frame 22b, typically as a sequence of blocks 24b. Each block 22a of the source frame 22a is first input into a motion estimation/compensation section 36 to produce predicted blocks 24c of a predicted frame 22c. A trailing artifact reduction section 32 is used to detect the presence of trailing artifacts T1, T2 in the predicted blocks 24c and to decide on an artifact reduction approach to use to avoid the appearance of the trailing artifacts T1, T2 in a reconstructed frame 58. The trailing artifact reduction section 32 interacts with the motion estimation/compensation section 36, a quantization section 48, and an intra mode coding section 33 which produces for a given source block 24a an intra coded macroblock, to detect the presence of trailing artifacts T1, T2 (see FIG. 3) in predicted blocks 24c and to minimize or eliminate the presence of the trailing artifacts T1, T2 in the reconstructed frame 58, as further explained below. It is recognised that intra prediction can also be used to produce an intra predicted block 24d (of an intra predicted frame 22d) corresponding to the source block 24a.

The source frame 22a and the reference frame 22b are used by the motion section 36 to find, for intercoding each source block 24a of interest in the source frame 22a, a best matching block taken from the blocks 24b in the reference frame 22b, such that temporal redundancies in the video data 12 are exploited for compression purposes. The matching block can be defined as the reference block 24b that minimises a prediction error 42 within a search area of the reference frame 22b. This matching process is done by the motion section 36 by determining movement of the object 26 (and of the background 28 if present, see FIG. 1) for a selected source block 24a, with respect to each reference block 24b from the frame 22b within the specified search area, by means of a block matching method as is known in the art. The predicted frame 22c is assembled by the motion section 36 as block 24c by block 24c to consist of matched blocks taken from the reference frame 22b, which correspond to the source blocks 24a obtained from the source frame 22a. The motion section 36 also computes a displacement/motion vector 38 for representing temporal differences corresponding to each block 24c. For inter coding prediction, a subtractor 40 computes the prediction error 42 between the source block 24a and the predicted block 24c, and passes the prediction error 42 to a transform section 44 for applying a forward transform, such as for example the Discrete Cosine Transform (DCT). In the case where a source block 24a is to be coded using the intra coding 33 mode, the forward transform is applied directly to the block 22a or to the prediction error 43 block obtained by subtracting the source block 22a from its intra predicted block 24d, as is (for example) specified in the emerging H.264 video coding standard. In this case, no displacement/motion vectors 38 would be needed.

The transform section 44 applies a frequency domain transform to the error 42 to produce a set of transform coefficients 46 representing the error 42. A quantization section 48 quantizes the set of transform coefficients 46 to produce a set of quantized coefficients 50, which are combined by an entropy coding section 49 with the motion vectors 38 and other encoder information to produce the compressed or encoded bit stream 15. A coding decision section 35 decides on whether the transform residuals would be entropy coded and sent in the bit stream 15 or not. The decoder 20 (see FIG. 1) of the receiving participant A,B processes the received bit stream 15 and then produces the reconstructed frame 58, using a stored copy of the reference frame 22b, the transmitted motion vectors 38, and the decompressed or reassembled prediction error 54 contained in the compressed bit stream 15. It is recognised that the motion vectors 38 are not operated on by the transform 44 and quantization 48 sections, but are included by the coding section 49 with the quantized coefficients 50 to assemble the bit stream 15.

For both interceded and intracoded blocks, the quantized coefficients 50 are sent to a dequantization-inverse transform section 52 of the encoder 18, to produce the reconstructed prediction error 54. An adder 56 then adds the predicted frame 22c with the error 54 to produce the new Nth reference or reconstructed frame 58 to be stored in the memory 34 for subsequent encoding of the next (N+1)th source frame (not shown). Except for entropy decoding, the encoder 18 (see FIG. 1) emulates the behaviour of the decoder 20 for coded blocks 22 to make sure the encoder 18 of the transmitting participant A,B and the decoder 20 of the receiving participant A,B work from the same reference frames 22b. It should be noted in the encoder 18 of FIG. 2 that the motion section 36 produces the predicted blocks 24c to represent the Nth source frame 22a, and the memory 34 stores reconstructed artifact reduced blocks to represent the reconstructed Nth reference frame 58. Accordingly, the removal section 32 is used as a filter to avoid or otherwise minimise artifacts in successive reconstructed versions of the video source frames 22a.

Figure 3:
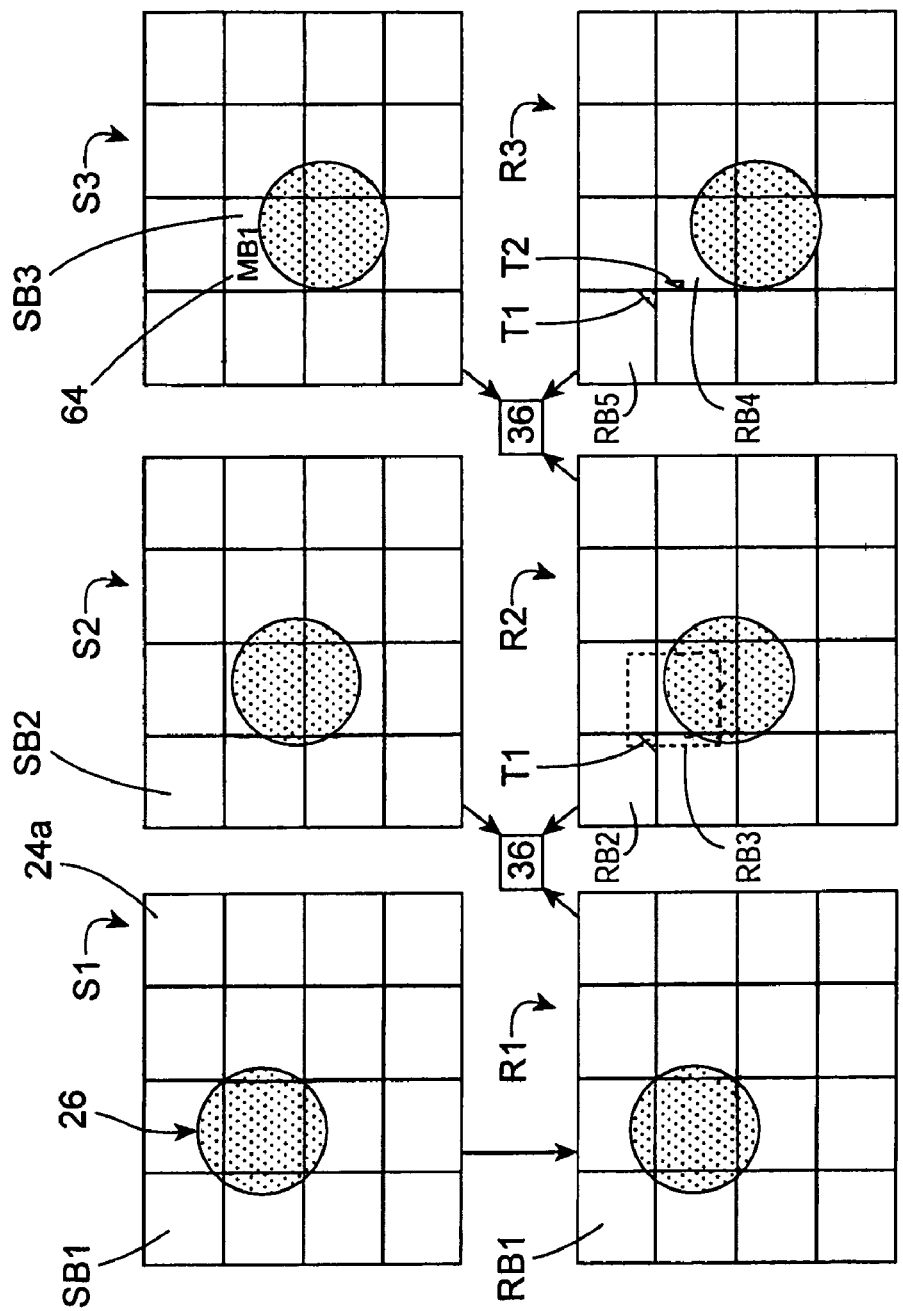
FIG. 3 shows trailing artifacts of the system of FIG. 1.

Referring to FIG. 3, an example of trailing artifacts T1, T2 production is given, which is related to motion in successive source frames 22a (referred to as S1, S2, and S3 representing (N−1)th, (N)th and (N+1)th source images respectively), and is directly related to situations where edges of the moving object 26 would fall on the edge pixels in the source blocks 24a. The reconstructed frames 58 are referred to as R1, R2 and R3 in FIG. 3, which correspond to the source frames S1, S2 and S3 respectively. The trailing artifacts T1, T2 are created by the motion estimation section 36 of the encoder 18 (see FIG. 2) and can be then reproduced in the reconstructed frames 58, referred to as R2, R3 representing the (N)th and (N+1)th reconstructed images respectively, in situations where the reduction section 32 is not employed.

For the purpose of illustrating the source of trailing artifacts T1 and T2, assume that the reconstructed frame R1 in FIG. 3 is an almost perfect reconstruction of the source frame S1. Let SB1 be the upper left macroblock in the source frame S1. It can be seen in FIG. 3 that few pixels of the moving object 26 are located at the edge of the macroblock SB1. Consequently, the same pixels would be located at the edge of the reconstructed macroblock RB1 in the reconstructed frame R1. The presence in macroblock RB1 of edge pixels corresponding to the moving object 26 sets the stage for the creation and propagation of trailing artifacts T1, T2, as described below in more detail.

Referring again to FIG. 3, the appearance of trailing artifacts T1,T2 involves two phases namely a creation phase and a propagation phase. The creation phase of the trailing artifact T1 leads to the presence of trailing artifact T1 in the reconstructed block RB2 corresponding to the source block SB2 in the source frame S2. The creation phase of the trailing artifact T1 typically involves two steps: 1) the edge of the moving object 26 falls on the pixels located at the edges of a macroblock SB1 in the source frame S1 and macroblock RB1 in the corresponding reconstructed frame R1, which are referred to as Affected Macroblocks, and which will affect the predicted block RB2 for the source macroblock SB2 in the source frame S2; 2) the second step could involve one or both of the following two scenarios. Scenario A can be referred to as a coding skip, where the motion estimation section 36 decides that the changes in the source macroblock SB2 as compared to the reference macroblock RB1 are so small that it can simply reuse the co-located reference macroblock RB1 of the reference frame R2 to represent the source macroblock SB2, without any additional compensation. It follows that the affected edge pixels will be reproduced again in the reconstructed macroblock RB2 by the decoder 20 and by the encoder 18 in the reconstructed macroblock RB2 in the reconstructed frame 58 (see FIG. 2), although the moving object 26 has moved away from the same location. Hence, the affected pixels appear out of place as the trailing artifact T1, and then seem to trail the moving object 26. Scenario B can be referred to as coding with a large quantization value. In this case, the motion estimation section 36 decides that the reference macroblock RB1 is the best match for the source macroblock SB1 and it wants to code the difference between source macroblock SB2 and the reference macroblock RB1. In the case where a high quantization value is used by the quantization section 48, it follows that the trailing artifact T1 will not be completely eliminated. The high quantization value would set to zero many of the transform AC coefficients 46, of the transform section 44 (see FIG. 1), corresponding to the prediction error 42. This would lead to a smeared trailing artifact T1, which would be less visible than in scenario A, but would nonetheless still be noticeable in the reconstructed frame 58.

The propagation phase of the trailing artifact follows the creation phase. Once the trailing artifact T1 is created within the macroblock RB2, it becomes susceptible to being reproduced by the motion estimation section 36 as the secondary trailing artifact T2 in subsequent predicted blocks in R3, usually in the same direction of motion as that of the moving object 26. Referring to FIG. 3, during the propagation phase, the macroblock RB2 is assumed to remain unchanged in future reference frames, following the creation of the trailing artifact T1. Accordingly, when the motion estimation section 36 is used to find the block in the reference frame R2 that best predicts the source block SB3 in the source frame S3, the motion estimation section 36 may decide that a good match for the source block SB3 is the block RB3 in the reference frame R2 that contains the affected edges in the macroblock RB2 in the reference frame R2. Hence, the artifact T1 would continue to appear at the same location in the macroblock RB3. Moreover, if the coding decision section 35, in conjunction with section 49, decides that it wants to skip coding the residuals associated with the prediction error for macroblock SB3 or if a high quantization parameter for the corresponding transform coefficients is used, the reconstructed macroblock RB4 would contain a portion of the artifact that was present in RB2 as shown in FIG. 3. It is recognised that the same propagation process may repeat itself in future frames for as long as coding is skipped or a high quantization step size is used, leading to the appearance of a series of trailing artifacts T1, T2 in the direction of motion of the object 26.

It can therefore be concluded based on the above example that the primary cause for the appearance of trailing artifacts T1, T2 is the use of an inadequate measure to evaluate the fitness of a predicted block 24c to accurately represent the source block 24a. The inadequacy of a fitness measure such as the Sum of Absolute Differences (SAD) that is used in most the existing motion estimation algorithms can result from the fact that the SAD accounts for the aggregate error in the whole block 24, but does not provide any indication of the magnitude of the peak errors within the predicted block 24c, which would provide an indication of the presence of trailing artifacts T1, T2.

Trailing artifacts T1,T2 could appear in any block 24 (see FIG. 1), but can be particularly visible in the blocks 24 of the frames 22 that have spatially uniform areas. This is because the human eye can easily detect the frame pixels with luminance or chrominance components different from those of the surrounding pixels in the uniform areas. It follows that blocks 24 that are spatially uniform are the prime target for the occurrence of trailing artifacts. Therefore, any block 24 containing spatially uniform areas is a target for the occurrence of trailing artifacts T1,T2.

Figure 5:
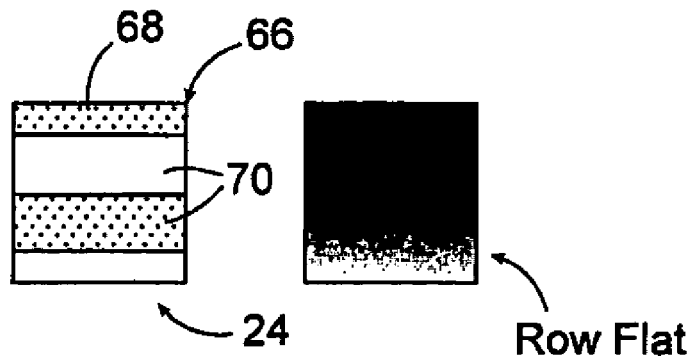
FIG. 5 shows an alternative embodiment of the flatness type of FIG. 4.
Figure 6:
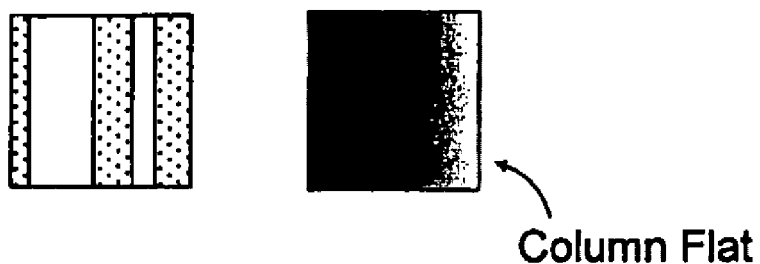
FIG. 6 shows an alternative embodiment of the flatness type of FIG. 4.
Figure 4:
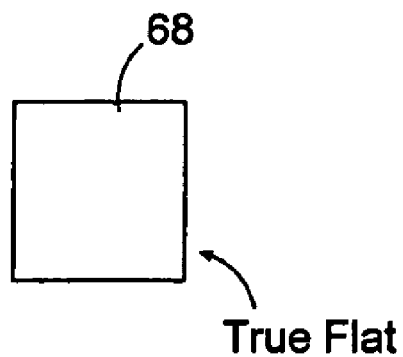
FIG. 4 shows an example flatness type for blocks processed by the system of FIG. 1.

Referring to FIGS. 4, 5 and 6, a few example types of flatness checks are introduced, which can be implemented by the removal section 32 (see FIG. 2) to identify the presence of trailing artifacts T1, T2 in the predicted block 24c. An M×N block 24 is considered to have True Flatness if the absolute values of the differences between the luminance values of pixels 68 and an average luminance value for the M×N block 24 are each less than the pre-specified luminance threshold (See FIG. 4). In general, Flat portions 66 (see FIG. 5) of a given M×N block 24 are determined by computing an average luminance value of the portion 66, computing for each pixel 68 in the portion 66 an absolute value of the difference between the luminance value for the pixel 68 and the average luminance value for the portion 66, and comparing each of the computed absolute values of the difference to a preset luminance threshold. If the absolute value of the difference is less than the pre-specified luminance threshold for all the pixels 68 in the portion 66, then the portion 66 is considered flat. The portion 66 could represent rows of pixels, columns of pixels, or an aggregate group of pixels in the M×N block 24. The above idea for determining flatness could be generalized to work on the basis of averages for m×n blocks within blocks 24 (where n could be different from N and m could be different from M) as opposed to working based on pixel values. The generalized flatness concept could be applied by first computing averages for m×n blocks within the portion 66, and then performing the rest of the computations as described above using averages of m×n blocks 24 as opposed to using pixel values.

Other examples of flat blocks include, such as but not limited to: 1) if all the row portions 66 in the block 24 are considered flat, then the M×N block 24 is considered to be Row Flat (see FIG. 5) if all top row portions 66 and/or all bottom row portions 66 in the block 24 are considered flat, then the M×N block 24 is considered to be Partially Row Flat (see FIG. 5) where more than one adjacent row can have similar degrees of absolute value differences (flatness) situated in bands 70; 3) if all the column portions 66 in the block 24 are considered flat, then the M×N block 24 is considered to be Column Flat (see FIG. 6) if all leftmost M column portions 66 and/or all rightmost M column portions 66 in the block 24 are considered flat, then the M×N block 24 is considered to be Partially Column Flat (see FIG. 6). It is recognized that there can be other types of flat blocks, including combinations of the above discussed types.

Figure 7:
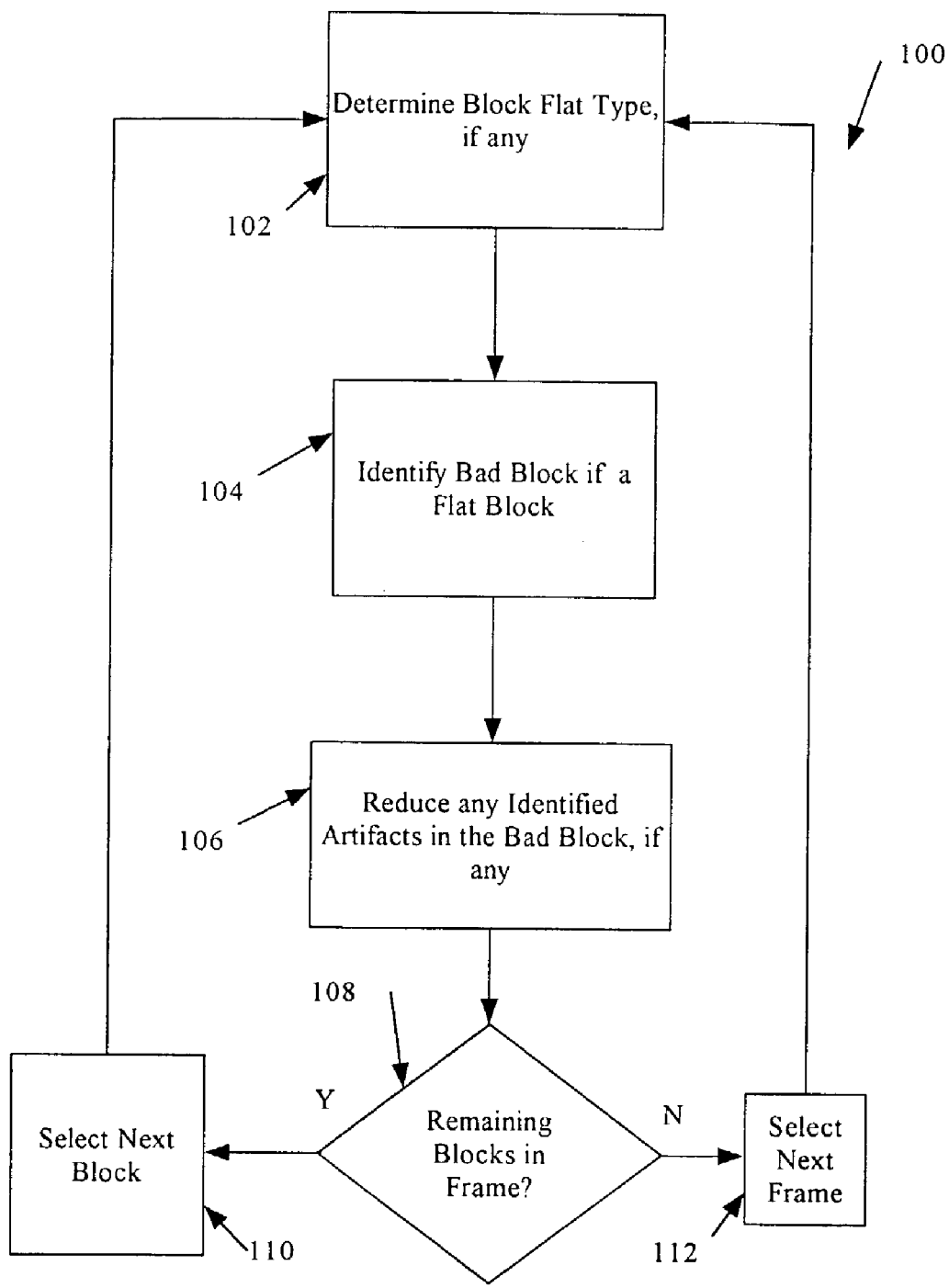
FIG. 7 is a flowchart for reducing the occurrence of trailing artifacts for the system of FIG. 1.

Referring to FIG. 7, a trailing artifact avoidance algorithm 100 is shown to help minimise the appearance of luminance and chrominance trailing artifacts T1, T2 (see FIG. 3) in block-based video encoders 18. For example, the algorithm could be implemented by the section 32 (see FIG. 2). For each block 24a of the source frame 22a (see FIG. 1), the algorithm 100 identifies 102 flat blocks in the source frame 22a that are most susceptible to the appearance of trailing artifacts T1,T2, and flatness is determined according to several proposed criteria as further given below. The algorithm also identifies 104 bad blocks, which refer to predicted blocks 24c that would be produced by the motion section 36 (corresponding to the determined flat blocks in the source frame 22a) and that contain trailing artifacts, absent the operation of the artifact reduction section 32. The algorithm 100 also removes 106 or otherwise reduces the detected trailing artifacts T1,T2 when they are detected within the bad blocks of the predicted blocks 24c. The artifact removal or avoidance is done for each 108 block 24c by employing one or more tools from among a proposed set of high fidelity coding tools and/or high performance motion estimation tools, as further explained below. Each block 24a and source frame 22a are operated 110, 112 on in sequence. Accordingly, the artifact removal or avoidance produces using the high performance motion estimation tools a revised predicted block 24c for eventual encoding, and/or results in a reconstructed block in the reconstructed frame 58 that accurately represents the source block 24a through the use of high fidelity coding tools.

Figure 8:
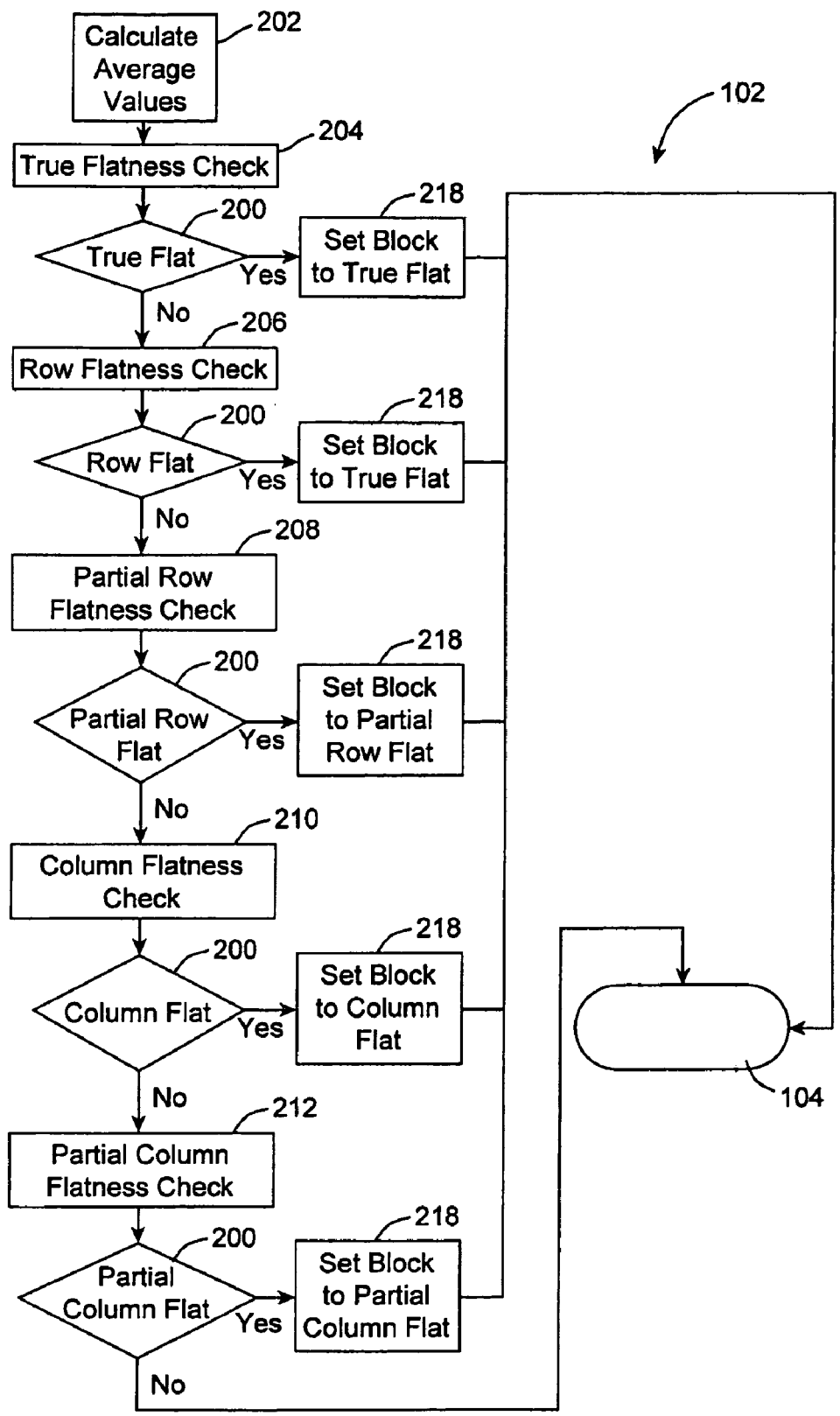
FIG. 8 shows further details of the flat block typing for the flowchart of FIG. 7.

Referring to FIG. 8, the algorithm 100 (see FIG. 7) step of determining 102 the block 24 type is further described using an example, which checks 200 for flatness for different M×N block 24 sizes and shapes. The step 102 identifies blocks 24a in the source frame 22a that are targets for the appearance of trailing artifacts T1,T2. Such blocks 24a once identified are called Flat Blocks. The step 102 calculates the average luminance values 202 for each type of portion 66 (see FIG. 4) to be checked 200. The identification of flat areas or portions 66 in the source frame 22a is performed according to several criteria for flatness including such as but not limited to True Flatness 204, Row Flatness 206, Column Flatness 208, Partial Row Flatness 210, and Partial Column Flatness 212. The criteria of the steps 204, 206, 208, 210, 212 include: computing the average luminance of the portion 66 (row, column, whole block, etc . . . ); computing, for each pixel in the portion 66, the absolute value of the difference between the luminance value for the pixel and the average luminance value for the portion 66; and comparing each of the computed absolute values of the differences to a preset luminance threshold, where if the absolute values of the differences are less than the pre-specified threshold for all the pixels in the portion 66 then the portion 66 is considered flat. It is recognized that the step 202 for calculating the average values could be shared between the steps 204, 206, 208, 210, 212 if desired.

The Flatness checks 200 identify those blocks 24a in the source frame 22a that have certain flatness features that make them vulnerable to the appearance of trailing artifacts T1,T2. The flatness checks 200 are preferably performed on luminance blocks in the source frame 22a. When a Flat Block is identified, the flatness checks 200 raise a flag 218 that causes the algorithm 100 to subsequently check 104 for whether the predicted block 24c corresponding to the identified flat block in the source frame 22a is a bad block, as further explained below. It is recognised that combinations of checks 200 could be used to determine if the source block 24a under consideration has more than one type of flatness. It is further recognized that the step 102 (referring to FIG. 8) could be arranged in many different ways, such that the first check 200 would capture most of the commonly encountered flat blocks (for example true flat 204), the second check 200 would capture the second most likely type of flat blocks (for example row flat 204), and so on. By organizing the order of the check 200 types in such a manner, according to known video data 12 flat type characteristics, the flatness step 102 can be made more efficient and help avoid the implementation of any extra unnecessary checks in the algorithm 100.

After the block flatness type has been determined 102 for a given source block 24a by the algorithm 100 (see FIG. 7), the bad block check 104 is performed on the predicted block 24c corresponding to the flat source block 24a in order to detect the presence of any trailing artifacts T1, T2 in the predicted block 24c. The idea of bad block checking is to examine the difference between the source block 24a and the corresponding predicted block 24c along the block edges to make sure there are no high luminance/chrominance prediction errors corresponding to pixels at the edges of the identified flat M×N block 24a. It is considered that if no high prediction error values are found, then the predicted block 24c corresponding to the flat block 24a does not need any further processing by the reduction section 32 (see FIG. 2). The following introduces different example bad block checks.

Figure 9:
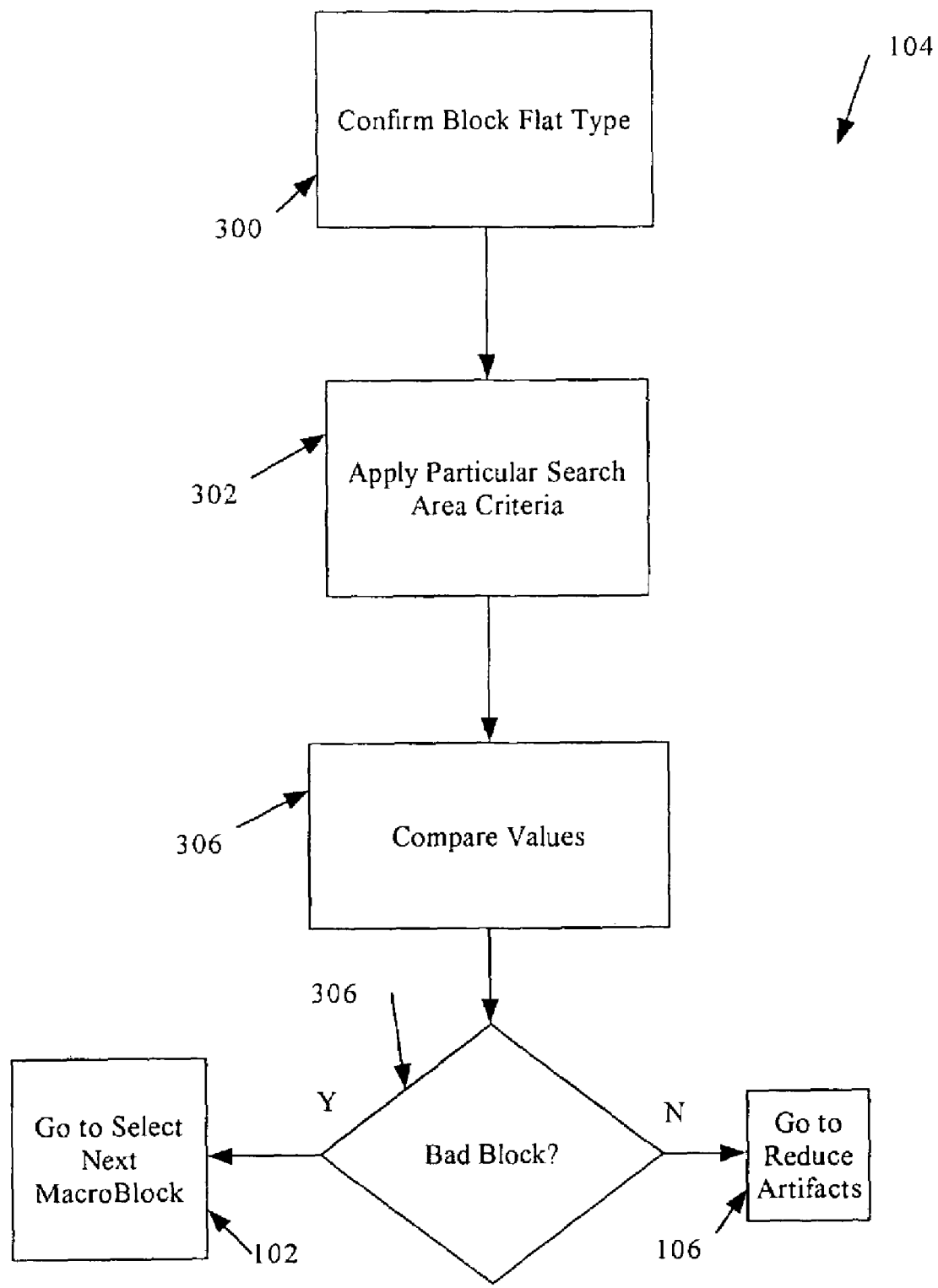
FIG. 9 shows further details of the flowchart of FIG. 7.

Referring to FIG. 9, complete border checking (CBC) is applied to an M×N predicted block 24c only if the corresponding block in the source frame 24a has been identified 300 as being True Flat, Row Flat, or Column Flat by the step 102 of FIG. 7. Accordingly, the CBC version of the bad block step 104 checks for trailing artifacts T1,T2 by applying search area criteria 302 of considering all boundary pixels in the predicted block 24c that are within L1 pixels, where L1 could be set to 2 for example, from the boundary or border of the M×N block 24c. The step 306 computes an absolute value of the difference between the actual border pixel value in the source block 24a and the predicted border pixel value from the predicted block 24c for each selected boundary pixel, and then compares the absolute value of the difference to a pre-specified error threshold (luma or chroma depending upon the pixel values under consideration). If the computed absolute value of the difference for a given border pixel is greater than 306 the pre-specified threshold, then the corresponding border pixel is considered a bad pixel. Further, if the total number of bad pixels in the checked area is non zero but less than a predefined MIN_NUMBER_of-_Bad_Pixels_1 (such as 8), then the M×N block 24c is considered a Bad Block and the Macroblock containing the M×N Bad Block 24c is also considered a Bad Block. The algorithm 100 then continues on to step 106. Otherwise, the next block 24c is selected 102 for flatness typing. The reason why the number of bad pixels should be smaller than a given threshold is that a high number of bad pixels may indicate a prediction problem that is not necessarily related to the presence of trailing artifacts T1, T2.

Further referring to FIG. 9, an alternative Partial Boarder Checking (PBC) is applied to an M×N predicted block 24c only if the corresponding block in the source frame 22a has been identified as being Partially Row Flat or Partially Column Flat by the step 102 of FIG. 7. Accordingly, the PBC version of the bad block step 104 checks for trailing artifacts T1,T2 by applying search area criteria 302 of considering boundary pixels in the predicted block 22c that are within L2 pixels (for example L2=2) from the boundary of the M×N block 24c and that are located in the portions 66 (see FIGS. 5 and 6) of lower rows, top row, left column, or right columns that have been identified as being flat. The use of this flatness type helps to reduce the number of border pixels that have to be compared. The rest of the PBC version is as above for the CBC, with the exception that the absolute value of the difference between the actual pixel value and the predicted pixel value is computed only for each boundary pixel in the identified flat portions 66.

Following the detection of a Bad Block of the predicted block 24c, the algorithm 100 tries to remove or avoid the trailing artifacts T1, T2. The algorithm 100 makes use of two approaches to avoid trailing artifacts T1, T2 identified in the bad blocks. Once a bad luminance block or bad chrominance block has been detected by step 104 (see FIG. 7), a decision component 400 (see FIG. 10) in the trailing algorithm 100 makes a decision on how to deal with the bad block at hand. The decision component 400 makes use of either a high fidelity coding approach 402 and/or a high performance motion estimation approach 404 to avoid the appearance of the trailing artifacts T1, T2 in the reconstructed frame 58, which is a product of the revised predicted block 24c and/or the high fidelity coding of the prediction residuals 42 or of the source block 24a.

Figure 10:
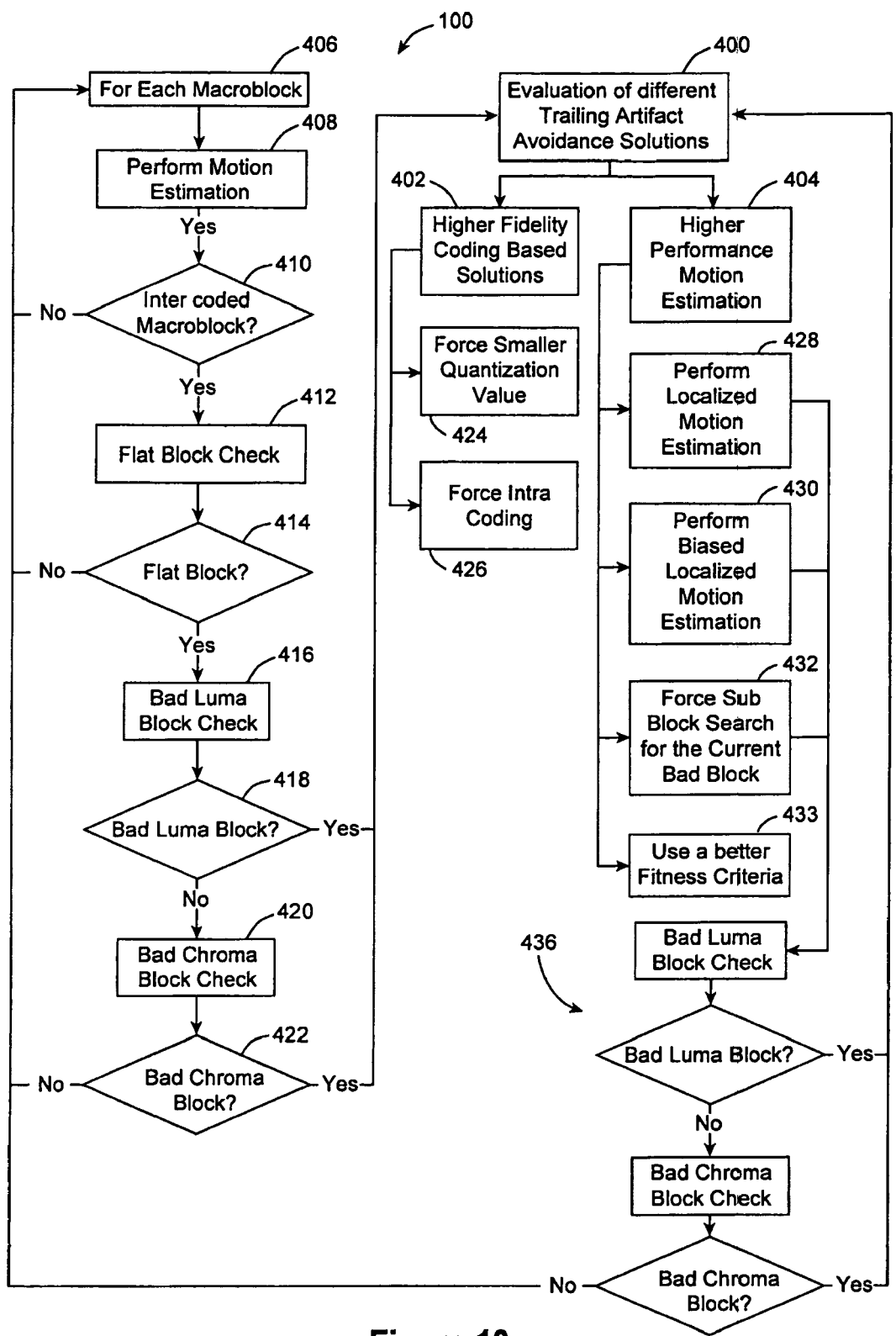
FIG. 10 shows further details of the flowchart of FIG. 7.

Referring to FIG. 10, the preliminary steps of the algorithm 100, as discussed in more detail above, are as follows. The motion section 36 (see FIG. 2) receives 406 the source block 22a from the frame memory 30, starts to perform the motion estimation 408, and decides 410 if the block 22a is to be interceded. If so, the algorithm 100 (through either the sections 36 and/or 32) checks 412 for a flat block. If the predicted block 24c is deemed 414 flat, then a luma bad block check 416, 418 is performed, and a chroma bad block check 420, 422 is also performed if desired. Accordingly, if the predicted block is deemed a bad block, then the block 24a is processed by the decision component 400. For example, if the bad block is detected and it is desired not to significantly increase the bit rate, then one may choose to try the localized search option first to see if one could come up with a better predicted block. If on the other hand the video quality is of primary concern, then one may try to use the high fidelity coding option (e.g., lowering the quantization value).

The high fidelity coding solutions 402 of the decision component 400 provide the means to help ensure that the reconstructed macroblock of the frame 58 (see FIG. 2) accurately represents the source macroblock 22a, with minimised trailing artifacts T1, T2, i.e. the reconstructed frame 58 is now compensated for the minimisation of the trailing artifacts T1, T2, otherwise called a compensated reconstructed frame 58. Two approaches can be used in this regard, namely coding of residuals using a low quantization value 424, or intra coding 426. Coding of residuals with a low quantization value may reduce the appearance of trailing artifacts T1, T2 in the predicted frame 22c, but does not necessarily eliminate them. It is recognised that high fidelity coding tools do not produce a revised predicted block 24c, as is the case when high performance motion estimation tools are used. Further, trailing artifacts T1, T2 would not be present in intra coded macroblocks corresponding to source macroblocks 24a. Coding of residuals 424 is applied by making sure the luminance residuals and/or the chrominance residuals of the error 42 (see FIG. 2) are coded using a very low quantization value. Accordingly, the isolated high magnitude pixel errors corresponding to bad pixels would be captured and then reproduced, so that the compensated prediction block 24c and eventual reconstructed macroblock of the frame 58 would provide a very accurate representation of the source block 22a, and consequently, any luminance or chrominance trailing artifacts T1, T2 would be reduced. The particular quantization value used for the step 424 could be predefined and related to the degree and/or number of errant boundary pixels contained in predicted block 24c defined as the bad block. For example, the higher the number of errant pixels, the lower the value of the quantization value would be. Intra coding would apply to the source macroblock 22a or to the intra prediction error for the source macroblock 22a and consequently there would be minimal trailing artifacts present in the reconstructed frame 58.

Referring again to FIG. 10, the high performance motion estimation step 404 provides compensated or revised predicted macroblocks 24c that are relatively free of trailing artifacts T1, T2, and without significantly affecting the bit rate of the coded bit stream 15 (see FIG. 1). The main approaches in high performance motion estimation 404 are the use of localized motion estimation 428, biased localized motion estimation 430, the use of smaller block sizes 432 in motion estimation, and the use of fitness criteria other than the SAD. For further clarity, the revised predicted block 24c is used to assemble the compensated reconstructed block making up the compensated reconstructed frame 58.

Localized motion estimation 428 is used to search for better-predicted blocks 24c in an area neighbouring a predicted bad block that is part of the bad macroblock. Whenever the bad luminance block or bad chrominance block is identified within a predicted macroblock 24c, a predefined search area is set around the predicted bad block in the reference frame 22b, and the motion estimation algorithm 100 of the motion section and/or artifact reduction section 32 (see FIG. 2) performs a search using the same block size as that of the predicted bad block within the search area. The size of the predicted block 24c could be the same as that of a macroblock or could be smaller than that of a macroblock. Localized motion estimation 428 could be performed using one or multiple reference frames 22b (see FIG. 2).

Localized biased motion estimation 430 is used to search for better-predicted blocks 24c in an area neighbouring a predicted bad chrominance block that is part of a bad macroblock. Whenever a bad chrominance block is identified within a predicted macroblock 24c, a predefined search area is set around the predicted bad block, and the motion estimation algorithm 100 of the motion section and/or artifact reduction section 32 (see FIG. 2) performs a search using the same block size as that of the predicted bad block within the search area. The difference between biased localized motion estimation 430 and the localized motion estimation 428 is that the former would augment the criteria it uses to accept good predicted blocks with a function of the chrominance prediction error as opposed to relying on, among other things, a function of the luminance prediction error. For example, a criterion for accepting predicted macroblocks 24c in biased localized motion estimation 430 could be a function of the Sum of Absolute Differences for the luminance prediction error and of the Sum of Absolute Differences for the chrominance prediction error. Biased localized motion estimation 430 could be performed using one or multiple reference frames.

The use of smaller block sizes in motion estimation could be adopted as a method to deal with trailing artifacts T1,T2 in the case where a given block within a macroblock 24c has been identified as a bad block, and smaller block sizes could be used in performing motion estimation for the identified bad block. In such a case, the motion estimation algorithm 100 of the motion section and/or artifact reduction section 32 (see FIG. 2) could be forced to search for a better predicted block 24c using smaller block sizes. Using smaller block sizes in motion estimation has the potential of presenting predicted blocks that are free of trailing artifacts T1, T2 since working with smaller block sizes offers more possibilities of finding better matches for the corresponding block in the source macroblock 24a due to increased block by block resolution.

Whenever a bad block is detected, the motion estimation section 36 could make use of a better fitness measure 433 to increase the likelihood that the selected predicted block 24c in motion estimation is free of trailing artifacts T1, T2. For example, the use of the Sum of the Squares of the Prediction Errors would accentuate the contribution of large pixel errors. Consequently, the motion estimation algorithm 100 would tend to use blocks with small errors that are distributed over the block as opposed to blocks with localized large errors. Hence, the motion estimation algorithm 100 would less likely present predicted blocks 24c that have trailing artifacts T1, T2.

In summary, the algorithm 100 provides for trailing artifact avoidance or reduction in compensated reconstructed frames 58, such that the revised predicted block 24c and/or the compensated reconstructed frame 58 would provide a very accurate representation of the corresponding source block 24a, and consequently, any or most of the luminance or chrominance trailing artifacts T1, T2 would be reduced. This compensated reconstructed frame 58 is provided by an interaction between the motion section 36, the quantization section 48, the intra coding mode section 33, and the artifact reduction section 32, however it is envisioned that the functionality of the sections 32, 48, 33 and 36 could be combined in a number of ways, if desired. The algorithm 100 has three main components, namely; means to check for flatness for the different block sizes and shapes; means to detect Bad Blocks, where a bad block is defined as any predicted block 24c corresponding to a flat block in the source frame 22a and which contains luminance trailing artifacts or chrominance trailing artifacts T1, T2; and means to avoid trailing artifacts T1,T2 or otherwise compensate for same when the bad block is detected. Given that flatness is a relative concept, the proposed method for the identification of Flat Blocks will result in many different types of flat blocks depending on the how much of the block is flat and the way flatness is defined. The artifact reduction section 32 then takes the results of the flatness check, and in the case of a bad block, uses a specific set of decisions in motion estimation of the motion estimation/compensation section 36, the quantization section 48, the intra coding section 33 to avoid presenting the revised predicted block 24c and the reconstructed macroblock of the frame 58 with trailing artifacts T1, T2. The specific decisions used by the algorithm 400 of the artifact reduction section 32 can depend on the type of flatness that characterizes the macroblock 24c.

Further, the main functions and components of the system 100, namely identifying flat blocks in the source frame 22a, identifying bad blocks in the predicted frame 22c, and reducing trailing artifacts T1, T2, are all presented as components 32 working outside the motion estimation process of the motion section 36, and after the motion estimation process is completed. However, the functions of the algorithm 100 could all be rearranged according to the needs of the particular motion estimation process of the motion section 36, and other considerations within the encoder 18. For example, flatness checks could be performed before the start of motion estimation performed by the section 36, and bad block checks and/or the means to avoid trailing artifacts could be made as part of the motion estimation process of the section 36.

Referring to FIG. 2, it is further recognised that the motion estimation and compensation performed by the motion section 36 is based on dividing each source frame 22a into smaller size blocks and finding for each of the blocks 24a a best matching block 24b in the reference frame 22b, which represents the previously coded frame. Traditional video coding standards (H.261, H.263 profile 0, MPEG-2) are block based and consider only a 16×16 block size. However, the present trailing artifact avoidance algorithm 100 could also be applied to more recent video coding standards, which use more than one block 24 size in motion estimation and compensation. For example, H.263 Profile 3 and MPEG-4 make use of both 16×16 and 8×8 block sizes. Other emerging video coding standards offer an even wider selection of block sizes in motion estimation/compensation, for example, the H.264 video coding standard allows for 16×16, 16×8, 8×16, 8×8, 8×4, 4×8 and 4×4 block 24 sizes.

Figure 11:
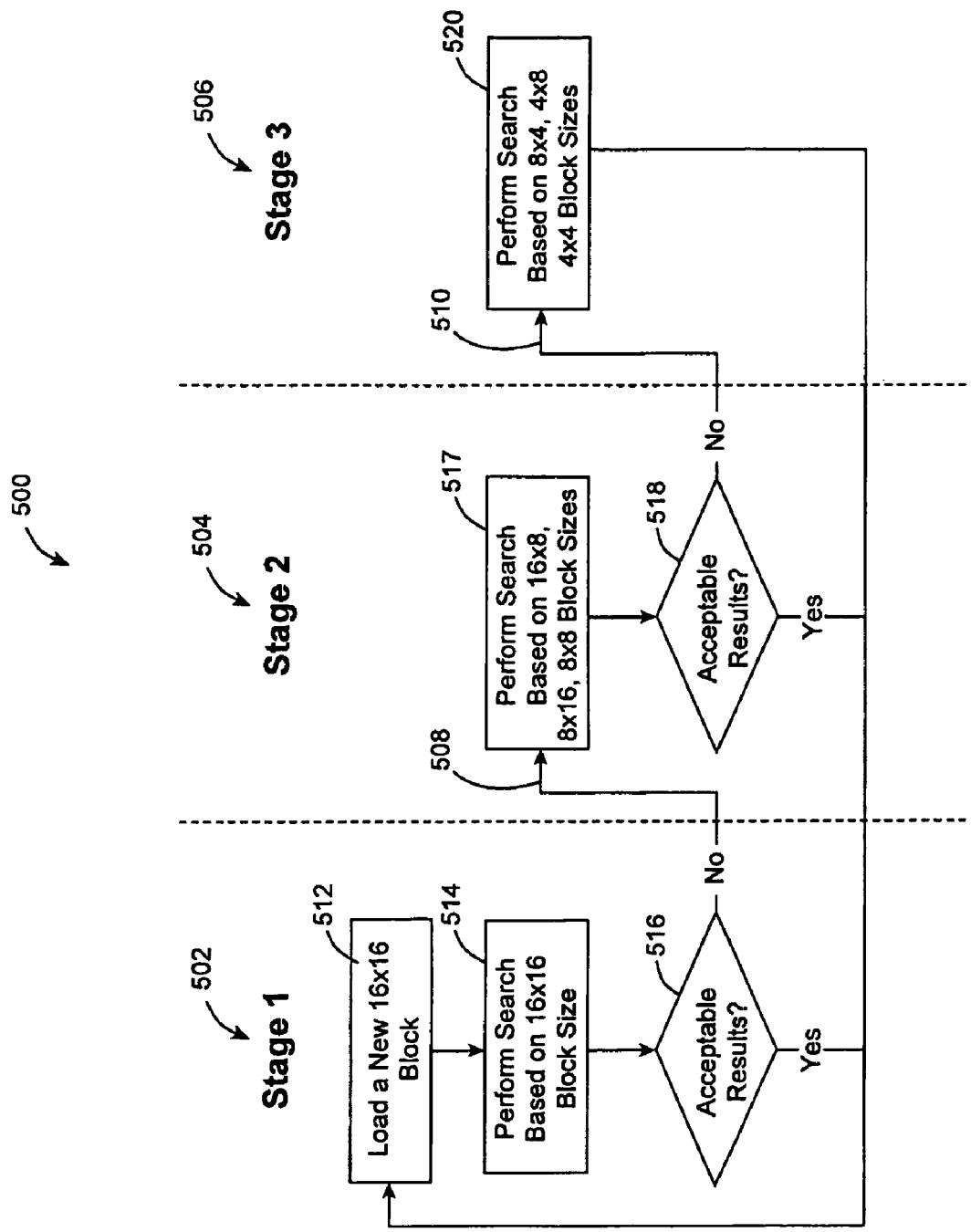
FIG. 11 shows an alternative embodiment of the flowchart of FIG. 7.

A further embodiment of the system is shown in FIG. 11, which presents an example of how to allow the algorithm 100 of FIG. 7 accommodate a multitude of block sizes, while at the same time helping to avoid the encoder 18 (see FIG. 2) from trying all the block sizes available which could place a considerable computational burden on the encoder 18. This represents a significant problem given that many applications require real time encoding performance and may not tolerate any delay in processing the incoming video frames 22a. To help avoid this problem, a hierarchical motion estimation approach 500 is shown in FIG. 11. The approach is based on classifying the block sizes that could be considered into distinct size groups (for example, based on the number of pixels that would be present in a block of a given size), performing the motion estimation of the algorithm 100 in stages, where each stage makes use of the block sizes belonging to only one size group. For example, in the case where 16×16, 16×8, 8×16, 8×8, 8×4, 4×8 and 4×4 block 24 sizes can be used, one can group the block sizes into three groups, the first group makes use of 16×16 block sizes, the second group makes use of 16×8, 8×16, 8×8 block sizes, and the third group makes use of the 8×4 and 4×8 block sizes. The motion estimation algorithm could then be performed (see FIG. 7) in three stages 502, 504, 506 with a conditional passage 508, 510 from one stage 502, 504, 506 to the next. Firstly, stage 502 considers 512 a 16×16 block size for the source blocks 22a and reference blocks 22b, and motion estimation 514 by the motion section 36 is performed based on that block size to produce the predicted block 22c. If a good matching block was found 516 in the reference frame 22b, then the motion estimation stage 502 takes the search results and moves to the next 16×16 block in the source frame 22a. The remaining blocks 22c are encoded in this manner, as described above with reference to FIG. 2.

However, if the results are deemed unacceptable, then the 16×16 block in the source frame 22a is divided into smaller block sizes that are 16×8, 8×16 and 8×8 in size and the pass 508 is used by the algorithm 500 to move to stage 504. The motion estimation 504 tries to find 517 the best matching blocks comprised of two 16×8 blocks, two 8×16 blocks or four 8×8 blocks. If the resulting 16×16 block is acceptable 518, the motion estimation stage 504 moves to the next 16×16 block in the source frame 22a at step 512 to repeat stage 502 for the next block. If not, the stage 504 uses the pass 510, and the 16×16 block in the source frame 22a is divided into smaller block sizes that are 8×4, 4×8 and 4×4 in size according to the stage 506. The motion estimation 506 tries to find 520 the best matching blocks comprised of a combination of 8×4, 4×8 and 4×4 block sizes. The resulting 16×16 block is accepted and the motion estimation stage 506 moves to the next 16×16 block in the source frame 22a at step 512 to repeat stage 502 for the next block. It is recognised that other descending orders of block sizes and shapes can be used other than that presented above.

Referring again to FIG. 11, the motion estimation algorithm 500 has a number of exit passes 508, 510 corresponding to different block shapes and sizes. In order to avoid predicted blocks 24c with trailing artifacts T1, T2, the predicted blocks 24c corresponding to flat blocks in the source frame 22a are checked in the search steps 514, 517, 520 for any trailing artifacts T1, T2. Further, the motion estimation algorithm 500 is also augmented with checks for bad blocks and the exit passes 508, 510 are modified in order to reduce as much as possible the number of exits from motion estimation at stages 502 and 504 with predicted blocks 24c that represent a good match for the source block 24a but that are also bad blocks.

Figure 12:
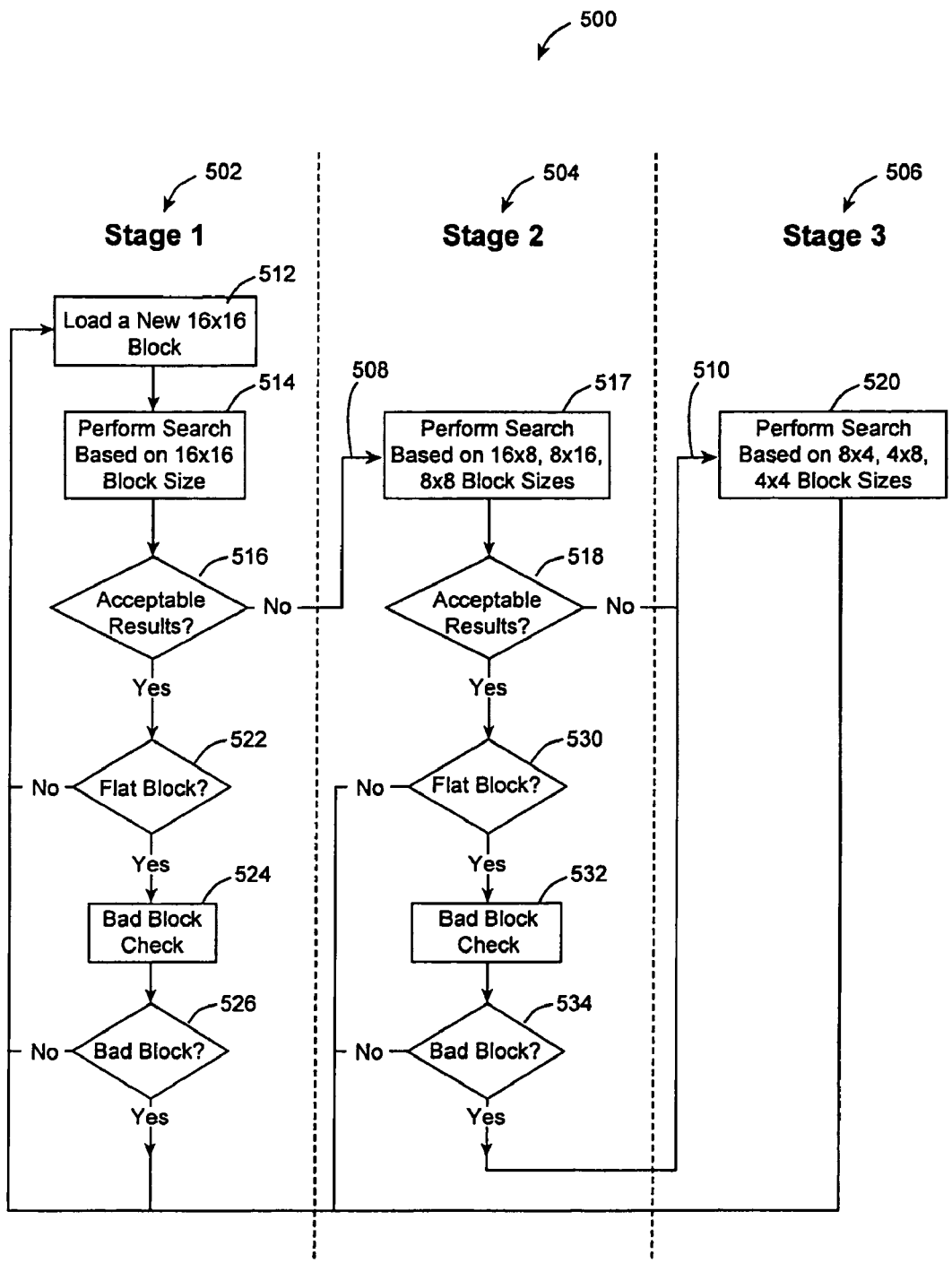
FIG. 12 shows further details of the flowchart of FIG. 11.

Referring to FIG. 12, the modifications to the motion estimation algorithm 500 for the stage 502 make use of 16×16 blocks, as loaded in step 512. In this stage 502, before the start of the motion estimation 514 by the section 36, flatness checks are performed by the artifact reduction section 32 on the 16×16 source block 22a under consideration. Once the motion estimation 514 by the section 36 for the 16×16 block is done, then if the resulting predicted 16×16 block 24c is considered to be a good fit according to the criteria of step 516, then if 522 the corresponding 16×16 block in the source frame 22a was flat, then a bad block check 524 is performed to see if there are any trailing artifacts T1,T2. If the resulting predicted 16×16 block 24c is not considered to be a good fit according to the criteria of step 516, then the motion estimation 500 moves to stage 504 of the motion estimation process to work with smaller block sizes. If the predicted 16×16 block 24a is considered to be a good fit according to the criteria of step 516, then a flatness check 522 is performed on the source block 24a. If the source block is not flat 522, then the motion estimation considers the predicted block 24c to be a good match for the source block 24a and then proceeds 512 to the next source block 24a. If on the other hand the source block is flat, then a bad block check 524 is performed on the predicted block 24c. If the predicted block 24c is not a bad block 526, then the motion estimation considers the predicted block 24c to be a good match for the source block 24a and then proceeds 512 to the next source block 24a. If on the other hand the predicted block turns out to be a bad block 526, then the motion estimation 500 moves to stage 504 of the motion estimation process to work with smaller block sizes.

Stage 504 of the motion estimation 500 makes use of 16×8, 8×16 and 8×8 blocks. In this stage 504, before the start of the motion estimation 517 by section 36, flatness checks are performed by the artifact reduction section 32 on all the 16×8, 8×16, and 8×8 sub-blocks within each 16×16 source block 22a under consideration. Once the motion estimation 517 for the 16×16 block is completed in this stage 504 using the 16×8, 8×16, and 8×8 block sizes, the best result from the motion estimation is examined to see if it is considered to be a good fit according to the criteria of step 518. If the resulting predicted 16×16 block 24c is not considered to be a good fit according to the criteria of step 518, then the motion estimation 500 moves to stage 506 of the motion estimation process to work with smaller block sizes. However, if the resulting predicted 16×16 block 24c is considered to be a good fit according to the criteria of step 518, then a flat block check 530 is performed on the source block 24a. The flatness check is performed 530 on all of the sub-blocks in the source block 24a that correspond to the sub-blocks that make up the resulting predicted 16×16 block 24c. If none of the sub-blocks in the source block is flat 530, then the motion estimation considers the predicted block 24c to be a good match for the source block 24a and then proceeds 512 to the next source block 24a. If any of the sub-blocks mentioned above is flat in any sense, then the 16×16 source block 24a is considered flat. A bad block check 532 is then performed on all sub-blocks in the predicted block 24c corresponding to flat sub-blocks in the source block 24a to see if any of those sub-blocks in the predicted block 24c contain any trailing artifacts T1, T2. If none of the sub-blocks in the predicted block 24c corresponding to flat sub-blocks in the source block 24a is bad 534, then the motion estimation considers the predicted block 24c to be a good match for the source block 24a and then proceeds 512 to the next source block 24a. If any of the sub-blocks in the predicted block 24c is identified 534 as a bad block 534, then the motion estimation is forced to go to stage 506 of the motion estimation process to work with smaller block sizes. Stage 506 of the motion estimation 500 makes use of 8×4, 4×8 and 4×4 blocks. In this stage 506, once the motion estimation 520 for the 16×16 block is completed using the 8×4, 4×8, and 4×4 block sizes, the best result from the motion estimation is considered to be the final solution.

It is noted that reductions of the trailing artifacts T1,T2 in the revised predicted block 24c result from the use of the high performance motion estimation tools. The avoidance of trailing artifacts T1,T2 can also be done by keeping the identified bad predicted block 24c from the motion estimation section 36 and instead using low quantization values with the prediction residuals, or simply by ignoring the predicted block 24c by the motion estimation section 36 and instead using the intra coding mode on the source block 24a. For example, Inter coding makes use of the predicted block 24c obtained from the reference frame 22b, and is based on coding the quantized transform coefficients corresponding to the prediction residuals 42 (difference between the source block 24a and the Inter predicted block 24c) and motion vector 38 information. The high performance motion estimation tools make use of Inter coding, and produce the revised predicted block 24c once the identified trailing artifacts T1, T2 have been identified and minimised. However, either using high fidelity or high motion performance motion estimation tools (i.e. artifact avoidance tools) allows for the production of the compensated reconstructed frame 58, in which the presence of trailing artifacts T1,T2 is minimised or otherwise reduced.

Further, it is recognised that Intra coding could be done in two different ways. For example, in some standards such as H.261, H.263, MPEG-4, Intra coding is based on applying the transform directly to the source block 24a and coding the transform coefficients. In the H.264 standard, Intra prediction is performed using the already coded surrounding blocks 24, and results in an Intra predicted version 24d of the source block 24a. The transform is then applied to the Intra prediction residuals 43 (difference between the source block 24a and the Intra predicted block 24d) and the resulting quantized coefficients are coded. Intra coding works directly with the source block 24a. On the other hand, the use of a smaller quantization value works with Inter prediction residuals. Therefore, in the case of high fidelity coding tools, there is no revised predicted block 24c. However, in both the case of the high performance motion estimation tools and the high fidelity coding tools, the ultimate result is that the presence of the trailing artifacts T1, T2 in the eventual compensated reconstructed frame 58 is minimized.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A system for avoiding an identified artifact from a predicted video block, the system comprising:
   a) an input for a source block having an array of source pixels and for the predicted block corresponding to the source block;
   b) a type processor for characterizing the source block as a predefined flat type by defining a grouping of the source pixels as having an average image characteristic;
   c) an artifact detector for locating a grouping of predicted pixels in the predicted block that indicate a presence of the artifact, when the predicted block corresponds to the source block having the predefined flat type; and d) an artifact avoidance processor for minimizing the presence of the identified artifact from a compensated reconstructed block corresponding to the predicted block;

wherein the identified artifact is absent from or visually less apparent in the compensated reconstructed block;

wherein the average image characteristic shared between the source pixels is selected from the group comprising luminance values and chrominance values; and wherein the pixels in the source pixel grouping are considered to have the average image characteristic by comparing each pixel image value with an average group image value for the whole source pixel grouping, such that all of the absolute values of the differences between the pixel image values and the average group image value are less than a predefined image characteristic threshold.

2. The system according to claim 1, wherein the predefined flat type is selected from the group comprising; true flatness, row flatness, column flatness, partial row flatness, and partial column flatness.

3. The system according to claim 1, wherein the predefined flat type is true flatness when the source pixel grouping represents all of the source pixels in the source block.

4. The system according to claim 1, wherein the predefined flat type is row flatness when the source pixel grouping represents all of the source pixels in a whole row of the source block, and when all the rows in the source block are flat.

5. The system according to claim 1, wherein the predefined flat type is column flatness when the source pixel grouping represents all of the source pixels in a whole column of the source block, and when all the columns in the source block are flat.

6. The system according to claim 1, wherein the predefined flat type is partial row flatness when the source pixel grouping represents all of the source pixels in a whole row of a specified set of adjacent rows of the source block, and when all the rows in any of the specified sets of adjacent rows are flat.

7. The system according to claim 1, wherein the predefined flat type is partial column flatness when the source pixel grouping represents all of the source pixels in a whole column of a specified set of adjacent columns of the source block, and when all the columns in any of the specified sets of adjacent columns are flat.

8. The system according to claim 1, wherein the artifact detector further identifies the presence of the artifact by employing a pixel check selected from the group comprising complete border checking and partial border checking.

9. The system according to claim 8, wherein the pixel check type is dependent upon the predefined flat type used by the type processor to characterize the source block.

10. The system according to claim 1, wherein the artifact detector further identifies the presence of the artifact by employing a pixel check performed for each pixel in a check group of the predicted pixels.

11. The system according to claim 10, wherein the pixel check is performed on the pixel image values selected from the group comprising luminance values and chrominance values.

12. The system according to claim 11, wherein the pixel check further compares the pixel values of the check group in the predicted block with the values of the corresponding pixels in the source block, such that the presence of an artifact pixel is confirmed when the corresponding absolute value of the difference between the predicted pixel value and the source pixel value is greater than a predefined pixel value threshold.

13. The system according to claim 12, wherein the presence of the artifact is further confirmed by the artifact detector when the number of confirmed artifact pixels is greater than zero and smaller than a predefined maximum number.

14. The system according to claim 10, wherein the check group is all of the predicted pixels located within a predetermined number of pixels from a border of the predicted block.

15. The system according to claim 10, wherein the check group is all of the predicted pixels located within a predetermined number of pixels from the border of the predicted block and located in a specified set of adjacent rows or columns.

16. The system according to claim 1, wherein the artifact avoidance processor further uses high fidelity coding to minimize the presence of the identified artifact in the reconstructed block that corresponds to the source block having the predefined flat type.

17. The system according to claim 16, wherein the high fidelity coding uses small quantization values for encoding prediction residuals corresponding to the predicted block.

18. The system according to claim 16, wherein the high fidelity coding uses intra coding of the source block.

19. The system according to claim 1, wherein the artifact avoidance processor further uses high performance motion estimation to minimise the presence of the identified artifact in a revised predicted block for producing the reconstructed block, the revised predicted block related to the source block having the predefined flat type.

20. The system according to claim 19, wherein the high performance motion estimation uses motion estimation solutions selected from the group comprising; localized motion estimation, biased localized motion estimation, the use of smaller block sizes, and the use of a better fitness measure to select the revised predicted block.

21. The system according to claim 20, wherein the localized motion estimation is performed in a limited region in the reference frame or in multiple reference frames around the location of the predicted block to produce the revised predicted block.

22. The system according to claim 20, wherein the biased localized motion estimation is performed in a limited region in the reference frame or in multiple reference frames around the location of predicted block in the reference frame and where the fitness measure for the predicted block makes use of both the luminance prediction error and a chrominance prediction error to produce the revised predicted block.

23. The system according to claim 20, wherein smaller block sizes, in comparison to the size of the predicted sub-block, are used in motion estimation for each predicted sub-block within the predicted block.

24. The system according to claim 20, wherein a fitness measure is used to select the predicted block such that the fitness measure amplifies larger prediction errors more than it amplifies smaller prediction errors.

25. The system according to claim 1 further comprising at least two stages for accommodating a plurality of source block sizes.

26. The system according to claim 25, wherein the at least two stages have a hierarchical reduction in block sizes.

27. The system according to claim 26, wherein there are at least three stages that have a hierarchical reduction in block sizes.

28. The system according to claim 25 further comprising a conditional pass between the stages.

29. The system according to claim 28 further comprising a plurality of the conditional passes, each corresponding to different block sizes.

30. The system according to claim 28 further comprising a plurality of the conditional passes, each corresponding to different block shapes.

31. The system according to claim 28 further comprising a plurality of the conditional passes, each corresponding to different block sizes.

32. The system according to claim 28 further comprising a plurality of the conditional passes, each corresponding to different block shapes.

33. The system according to claim 25, wherein the conditional pass is used by the artifact avoidance processor when the first stage does not produce an acceptable one of the predicted blocks.

34. A method for avoiding an identified artifact from a predicted video block, the method comprising the steps of:
   a) obtaining a source block having an array of source pixels and obtaining the predicted block corresponding to the source block;
   b) characterizing the source block as a predefined flat type by defining a grouping of the source pixels as having an average image characteristic;
   c) locating a grouping of predicted pixels in the predicted block that indicate a presence of the artifact, when the predicted block corresponds to the source block having the predefined flat type;
   d) minimizing the presence of the identified artifact from a compensated reconstructed block corresponding to the predicted block;
   wherein the identified artifact is absent from or visually less apparent in the compensated reconstracted block;
   e) identifying the presence of the artifact by employing a pixel check performed for each pixel in a check group of the predicted pixels; wherein the pixel check is performed on the pixel image values selected from the group comprising luminance values and chrominance values;
   f) comparing the pixel values of the check group in the predicted block with the values of the corresponding pixels in the source block, such that the presence of an artifact pixel is confirmed when the corresponding absolute value of the difference between the predicted pixel value and the source pixel value is greater than a predefined pixel value threshold; and
   g) confirming the presence of the artifact when the number of confirmed artifact pixels is greater than zero and smaller than a predefined maximum number.

35. The method according to claim 34 further comprising the step of identifying the presence of the artifact by employing a pixel check selected from the group comprising complete border checking and partial border checking.

36. The method according to claim 35, wherein the pixel check type is dependent upon the predefined flat type to characterize the source block.

37. A product for avoiding an identified artifact from a predicted video block, the product comprising:
   a) an input module stored in at least one of a magnetic disk, magnetic tape, optically readable media, and semiconductor memory, the input module for obtaining a source block having an array of source pixels and for obtaining the predicted block corresponding to the source block;
   b) a type module coupled to the input module for characterizing the source block as a predefined flat type by defining a group of the source pixels as having an average image characteristic;
   c) an artifact detector module coupled to the type module for locating a grouping of predicted pixels in the predicted block that indicate a presence of the artifact, when the predicted block corresponds to the source block having the predefined flat type; and
   d) an artifact avoidance module coupled to the detector module for minimizing the presence of the identified artifact from a compensated reconstructed block corresponding to the predicted block;
   wherein the identified artifact is absent from or visually less apparent in the compensated reconstructed block;
   wherein the average image characteristic shared between the source pixels is selected from the group comprising luminance values and chrominance values, and wherein the pixels in the source pixel grouping are considered to have the average image characteristic by comparing each pixel image value with an average group image value for the whole source pixel grouping, such that all of the absolute values of the differences between the pixel image values and the average group image value are less than a predefined image characteristic threshold.

38. The product according to claim 37, wherein the predefined flat type is true flatness such that the source pixel grouping represents all of the source pixels in the source block.

39. The product according to claim 37, wherein the predefined flat type is row flatness such that the source pixel grouping represents all of the source pixels in a whole row of the source block, and where all the rows in the source block are flat.

40. The product according to claim 37, wherein the predefined flat type is column flatness such that the source pixel grouping represents all of the source pixels in a whole column of the source block, and where all the columns in the source block are flat.

41. The product according to claim 37, wherein the predefined flat type is partial row flatness such that the source pixel grouping represents all of the source pixels in a whole row of a specified set of adjacent rows of the source block, and where all the rows in at least one of the specified sets of adjacent rows are flat.

42. The product according to claim 37, wherein the predefined flat type is partial column flatness such that the source pixel grouping represents all of the source pixels in a whole column of a specified set of adjacent columns of the source block, and where all the columns in at least one of the specified sets of adjacent columns are flat.

43. A system for avoiding an identified artifact from a predicted video block, the system comprising:
   a) an input for a source block having an array of source pixels and for the predicted block corresponding to the source block;
   b) a type processor for characterizing the source block as a predefined flat type by defining a grouping of the source pixels as having an avenge image characteristic;
   c) an artifact detector for locating a grouping of predicted pixels in the predicted block tat indicate a presence of the artifact, when the predicted block corresponds to the source block having the predefined flat type; and d) an artifact avoidance processor for minimizing the presence of the identified artifact from a compensated reconstructed block corresponding to the predicted block;

wherein the identified artifact is absent from or visually less apparent in the compensated reconstructed block;

wherein the artifact detector further identifies the presence of the artifact by employing a pixel check performed for each pixel in a check group of the predicted pixels; wherein the pixel check is performed on the pixel image values selected from the group comprising luminance values and chrominance values;

wherein the pixel check further compares the pixel values of the check group in the predicted block with the values of the corresponding pixels in the source block, such that the presence of an artifact pixel is confirmed when the corresponding absolute value of the difference between the predicted pixel value and the source pixel value is greater than a predefined pixel value threshold; and wherein the presence of the artifact is further confirmed by the artifact detector when the number of confirmed artifact pixels is greater than zero and smaller than a predefined maximum number.

44. The system according to claim 43, wherein the predefined flat type is selected from the group comprising; true flatness, row flatness, column flatness, partial row flatness, and partial column flatness.

45. The system according to claim 43, wherein the average image characteristic shared between the source pixels is selected from the group comprising luminance values and chrominance values.

46. The system according to claim 45, wherein the pixels in the source pixel grouping are considered to have the average image characteristic by comparing each pixel image value with an average group image value for the whole source pixel grouping, such that all of the absolute values of the differences between the pixel image values and the average group image value are less than a predefined image characteristic threshold.

47. The system according to claim 46, wherein the predefined flat type is true flatness when the source pixel grouping represents all of the source pixels in the source block.

48. The system according to claim 46, wherein the predefined flat type is row flatness when the source pixel grouping represents all of the source pixels in a whole row of the source block, and when all the rows in the source black are flat.

49. The system according to claim 46, wherein the predefined flat type is column flatness when the source pixel grouping represents all of the source pixels in a whole column of the source block and when all the columns in the source block are flat.

50. The system according to claim 46, wherein the predefined flat type is partial row flatness when the source pixel grouping represents all of the source pixels in a whole row of a specified set of adjacent rows of the source block, and when all the rows in any of the specified sets of adjacent rows are flat.

51. The system according to claim 46, wherein the predefined flat type is partial column flatness when the source pixel grouping represents all of the source pixels in a whole column of a specified set of adjacent columns of the source block, and when all the columns in any of the specified sets of adjacent columns are flat.

52. The system according to claim 43, wherein the artifact detector further identifies the presence of the artifact by employing a pixel cheek selected from the group comprising; complete border checking and partial border checking.

53. The system according to claim 52, wherein the pixel check type is dependent upon the predefined flat type used by the type processor to characterize the source block.

54. The system according to claim 43, wherein the check group is all of the predicted pixels located within a predetermined number of pixels from a border of the predicted block.

55. The system according to claim 43, wherein the check group is all of the predicted pixels located within a predetermined number of pixels from the border of the predicted block and located in a specified set of adjacent rows or columns.

56. The system according to claim 43, wherein the artifact avoidance processor further uses high fidelity coding to minimize the presence of the identified artifact in the reconstructed block that corresponds to the source block having the predefined flat type.

57. The system according to claim 56, wherein the high fidelity coding uses small quantization values for encoding prediction residuals corresponding to the predicted block.

58. The system according to claim 56, wherein the high fidelity coding uses intra coding of the source block.

59. The system according to claim 43, wherein the artifact avoidance processor further uses high performance motion estimation to minimise the presence of the identified artifact in a revised predicted block for producing the reconstructed block, the revised predicted block related to the source block having the predefined flat type.

60. The system according to claim 59, wherein the high performance motion estimation uses motion estimation solutions selected from the group comprising; localized motion estimation, biased localized motion estimation, the use of smaller block sizes, and the use of a better fitness measure to select the revised predicted block.

61. The system according to claim 60, wherein the localized motion estimation is performed in a limited region in the reference flame or in multiple reference frames around the location of the predicted block to produce the revised predicted block.

62. The system according to claim 60, wherein the biased localized motion estimation is performed in a limited region in the reference frame or in multiple reference frames around the location of predicted block in the reference frame and where the fitness measure for the predicted block makes use of both the luminance prediction error and a chrominance prediction error to produce the revised predicted block.

63. The system according to claim 60, wherein smaller block sizes, in comparison to the size of the predicted sub-block, are used in motion estimation for each predicted sub-block within the predicted block.

64. The system according to claim 60, wherein a fitness measure is used to select the predicted block such that the fitness measure amplifies larger prediction errors more than it amplifies smaller prediction errors.

65. The system according to claim 43 further comprising at least two stages for accommodating a plurality of source block sizes.

66. The system according to claim 65, wherein the at least two stages have a hierarchical reduction in block sizes.

67. The system according to claim 66, wherein there are at least three stages that have a hierarchical reduction in block sizes.

68. The system according to claim 65 further comprising a conditional pass between the stages.

69. The system according to claim 68 further comprising a plurality of the conditional passes, each corresponding to different block sizes.

70. The system according to claim 68 further comprising a plurality of the conditional passes, each corresponding to different block shapes.

71. The system according to claim 65, wherein the conditional pass is used by the artifact avoidance processor when the first stage does not produce an acceptable one of the predicted blocks.

72. A system for avoiding an identified artifact from a predicted video block, the system comprising:
  a) an input for a source block having an array of source pixels and for the predicted block corresponding to the source block;
  b) a type processor for characterizing the source block as a predefined flat type by defining a grouping of the source pixels as having an average image characteristic;
  c) an artifact detector for locating a grouping of predicted pixels in the predicted block that indicate a presence of the artifact, when the predicted block corresponds to the source block having the predefined flat type; and
  d) an artifact avoidance processor for minimizing the presence of the identified artifact from a compensated reconstructed block corresponding to the predicted block;
  wherein the identified artifact is absent from or visually less apparent in the compensated reconstructed block;
  wherein the artifact avoidance processor further uses high performance motion estimation to minimise the presence of the identified artifact in a revised predicted block for producing the reconstructed block, the revised predicted block related to the source block having the predefined flat type;
  wherein the high performance motion estimation uses motion estimation solutions selected from the group comprising; localized motion estimation, biased localized motion estimation, the use of smaller block sizes, and the use of a better fitness measure to select the revised predicted block; and
  wherein a fitness measure is used to select the predicted block such that the fitness measure amplifies larger prediction errors more than it amplifies smaller prediction errors.

73. The system according to claim 72, wherein the predefined flat type is selected from the group comprising; true flatness, row flatness, column flatness, partial row flatness, and partial column flatness.

74. The system according to claim 72, wherein the average image characteristic shared between the source pixels is selected from the group comprising luminance values and chrominance values.

75. The system according to claim 74, wherein the pixels in the source pixel grouping are considered to have the average image characteristic by comparing each pixel image value with an average group image value for the whole source pixel grouping, such that all of the absolute values of the differences between the pixel image values and the average group image value are less than a predefined image characteristic threshold.

76. The system according to claim 75, wherein the predefined flat type is true flatness when the source pixel grouping represents all of the source pixels in die source block.

77. The system according to claim 75, wherein the predefined flat type is row flatness when the source pixel grouping represents all of the source pixels in a whole row of the source block, and when all the rows in the source block are flat.

78. The system according to claim 75, wherein the predefined flat type is column flatness when the source pixel grouping represents all of the source pixels in a whole column of the source block, and when all the columns in the source block are flat.

79. The system according to claim 75, wherein the predefined flat type is partial row flatness when the source pixel grouping represents all of the source pixels in a whole row of a specified set of adjacent rows of the source block, and when all the rows in any of the specified sets of adjacent rows are flat.

80. The system according to claim 75, wherein the predefined flat type is partial column flatness when the source pixel grouping represents all of the source pixels in a whole column of a specified set of adjacent columns of the source block, and when all the columns in any of the specified sets of adjacent columns are flat.

81. The system according to claim 72, wherein the artifact detector further identifies the presence of the artifact by employing a pixel check selected from the group comprising; complete border checking and partial border checking.

82. The system according to claim 81, wherein the pixel check type is dependent upon the predefined flat type used by the type processor to characterize the source block.

83. The system according to claim 72, wherein the artifact detector further identifies the presence of the artifact by employing a pixel check performed for each pixel in a check group of the predicted pixels.

84. The system according to claim 83, wherein the pixel check is performed on the pixel image values selected from the group comprising luminance values and chrominance values.

85. The system according to claim 84, wherein the pixel check further compares the pixel values of the check group in the predicted block with the values of the corresponding pixels in the source block, such that the presence of an artifact pixel is confirmed when the corresponding absolute value of the difference between the predicted pixel value and the source pixel value is greater than a predefined pixel value threshold.

86. The system according to claim 85, wherein the presence of the artifact is further confirmed by the artifact detector when the number of confirmed artifact pixels is greater than zero and smaller than a predefined maximum number.

87. The system according to claim 83, wherein the check group is all of the predicted pixels located within a predetermined number of pixels from a border of the predicted block.

88. The system according to claim 83, wherein the check group is all of the predicted pixels located within a predetermined number of pixels from the border of the predicted block and located in a specified set of adjacent rows or columns.

89. The system according to claim 72, wherein the artifact avoidance processor further uses high fidelity coding to minimize the presence of the identified artifact in the reconstructed block that corresponds to the source block having the predefined flat type.

90. The system according to claim 89, wherein the high fidelity coding uses small quantization values for encoding prediction residuals corresponding to the predicted block.

91. The system according to claim 89, wherein the high fidelity coding uses intra coding of the source block.

92. The system according to claim 72, wherein the localized motion estimation is performed in a limited region in the reference frame or in multiple reference frames around the location of the predicted block to produce the revised predicted block.

93. The system according to claim 72, wherein the biased localized motion estimation is performed in a limited region in the reference frame or in multiple reference frames around the location of predicted block in the reference frame and where the fitness measure for the predicted block makes use of both the luminance prediction error and a chrominance prediction error to produce the revised predicted block.

94. The system according to claim 72, wherein smaller block sizes, in comparison to the size of the predicted sub-block, are used in motion estimation for each predicted sub-block within the predicted block.

95. The system according to claim 72 further comprising at least two stages for accommodating a plurality of source block sizes.

96. The system according to claim 95, wherein the at least two stages have a hierarchical reduction in block sizes.

97. The system according to claim 96, wherein there are at least three stages that have a hierarchical reduction in block sizes.

98. The system according to claim 95 further comprising a conditional pass between the stages.

99. The system according to claim 98 further comprising a plurality of the conditional passes, each corresponding to different block sizes.

100. The system according to claim 98 further comprising a plurality of the conditional passes, each corresponding to different block shapes.

101. The system according to claim 95, wherein the conditional pass is used by the artifact avoidance processor when the first stage does not produce an acceptable one of the predicted blocks.

102. A system for avoiding an identified artifact from a predicted video block, the system comprising:
   a) an input for a source block having an array of source pixels and for the predicted block corresponding to the source block;
   b) a type processor for characterizing the source block as a predefined flat type by defining a grouping of the source pixels as having an average image characteristic;
   c) an artifact detector for locating a grouping of predicted pixels in the predicted block that indicate a presence of the artifact, when the predicted block corresponds to the source block having the predefined flat type;
   d) an artifact avoidance processor for minimizing the presence of the identified artifact from a compensated reconstructed block corresponding to the predicted block;
   wherein the identified artifact is absent from or visually less apparent in the compensated reconstructed block; and
   e) at least two stages for accommodating a plurality of source block sizes;
   wherein the conditional pass is used by the artifact avoidance processor when the first stage does not produce an acceptable one of the predicted blocks.

103. The system according to claim 102, wherein the predefined flat type is selected from the group comprising; true flatness, row flatness, column flatness, partial row flatness, and partial column flatness.

104. The system according to claim 102, wherein the average image characteristic shared between the source pixels is selected from the group comprising luminance values and chrominance values.

105. The system according to claim 104, wherein the pixels in the source pixel grouping are considered to have the average image characteristic by comparing each pixel image value with an average group image value for the whole source pixel grouping, such that all of the absolute values of the differences between the pixel image values and the average group image value are less than a predefined image characteristic threshold.

106. The system according to claim 105, wherein the predefined flat type is true flatness when the source pixel grouping represents all of the source pixels in the source block.

107. The system according to claim 105, wherein the predefined flat type is row flatness when the source pixel grouping represents all of the source pixels in a whole row of the source block, and when all the rows in the source block are flat.

108. The system according to claim 105, wherein the predefined flat type is column flatness when the source pixel grouping represents all of the source pixels in a whole column of the source block, and when all the columns in the source block are flat.

109. The system according to claim 105, wherein the predefined flat type is partial row flatness when the source pixel grouping represents all of the source pixels in a whole row of a specified set of adjacent rows of the source block, and when all the rows in any of the specified sets of adjacent rows are flat.

110. The system according to claim 105, wherein the predefined flat type is partial column flatness when the source pixel grouping represents all of the source pixels in a whole column of a specified set of adjacent columns of the source block, and when all the columns in any of the specified sets of adjacent columns are flat.

111. The system according to claim 102, wherein the artifact detector further identifies the presence of the artifact by employing a pixel check selected from the group comprising; complete border checking and partial border checking.

112. The system according to claim 111, wherein the pixel check type is dependent upon the predefined flat type used by the type processor to characterize the source block.

113. The system according to claim 102, wherein the artifact detector further identifies the presence of the artifact by employing a pixel check performed for each pixel in a check group of the predicted pixels.

114. The system according to claim 113, wherein the pixel check is performed on the pixel image values selected from the group comprising luminance values and chrominance values.

115. The system according to claim 114, wherein the pixel check further compares the pixel values of the check group in the predicted block with the values of the corresponding pixels in the source block, such that the presence of an artifact pixel is confirmed when the corresponding absolute value of the difference between the predicted pixel value and the source pixel value is greater than a predefined pixel value threshold.

116. The system according to claim 115, wherein the presence of the artifact is further confirmed by the artifact detector when the number of confirmed artifact pixels is greater than zero and smaller than a predefined maximum number.

117. The system according to claim 113, wherein the check group is all of the predicted pixels located within a predetermined number of pixels from a border of the predicted block.

118. The system according to claim 113, wherein the check group is all of the predicted pixels located within a predetermined number of pixels from the border of the predicted block and located in a specified set of adjacent rows or columns.

119. The system according to claim 102, wherein the artifact avoidance processor further uses high fidelity coding to minimize the presence of the identified artifact in the reconstructed block that corresponds to the source block having the predefined flat type.

120. The system according to claim 119, wherein the high fidelity coding uses small quantization values for encoding prediction residuals corresponding to the predicted block.

121. The system according to claim 119, wherein the high fidelity coding uses intra coding of the source block.

122. The system according to claim 102, wherein the artifact avoidance processor further uses high performance motion estimation to minimise the presence of the identified artifact in a revised predicted block for producing the reconstructed block, the revised predicted block related to the source block having the predefined flat type.

123. The system according to claim 122, wherein the high performance motion estimation uses motion estimation solutions selected from the group comprising; localized motion estimation, biased localized motion estimation, the use of smaller block sizes, and the use of a better fitness measure to select the revised predicted block.

124. The system according to claim 123, wherein the localized motion estimation is performed in a limited region in the reference frame or in multiple reference frames around the location of the predicted block to produce the revised predicted block.

125. The system according to claim 123, wherein the biased localized motion estimation is performed in a limited region in the reference frame or in multiple reference frames around the location of predicted block in the reference frame and where the fitness measure for the predicted block makes use of both the luminance prediction error and a chrominance prediction error to produce the revised predicted block.

126. The system according to claim 123, wherein smaller block sizes, in comparison to the size of the predicted sub-block, are used in motion estimation for each predicted sub-block within the predicted block.

127. The system according to claim 123, wherein a fitness measure is used to select the predicted block such that the fitness measure amplifies larger prediction errors more than it amplifies smaller prediction errors.

128. The system according to claim 102, wherein the at least two stages have a hierarchical reduction in block sizes.

129. The system according to claim 128 wherein there are at least three stages that have a hierarchical reduction in block sizes.

130. The system according to claim 102 further comprising a conditional pass between the stages.

* * * * *